US012426020B2

(12) United States Patent
Wei et al.

(10) Patent No.: US 12,426,020 B2
(45) Date of Patent: Sep. 23, 2025

(54) SYSTEMS AND METHODS FOR UPLINK TRANSMISSION SWITCHING

(71) Applicant: ZTE CORPORATION, Guangdong (CN)

(72) Inventors: Xingguang Wei, Shenzhen (CN); Jing Shi, Shenzhen (CN); Yu Ngok Li, Shenzhen (CN); Peng Hao, Shenzhen (CN); Kai Xiao, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 419 days.

(21) Appl. No.: 17/950,683

(22) Filed: Sep. 22, 2022

(65) Prior Publication Data
US 2023/0046553 A1 Feb. 16, 2023

Related U.S. Application Data

(63) Continuation of application No. PCT/CN2021/071302, filed on Jan. 12, 2021.

(51) Int. Cl.
*H04W 72/0446* (2023.01)

(52) U.S. Cl.
CPC .............. *H04W 72/0446* (2013.01)

(58) Field of Classification Search
CPC ........... H04W 72/0446; H04W 72/0453
See application file for complete search history.

(56) References Cited

U.S. PATENT DOCUMENTS

| 2016/0119946 | A1  | 4/2016  | Dai et al. |
| 2023/0199586 | A1* | 6/2023  | Li .................. H04W 8/24 370/329 |
| 2023/0232395 | A1* | 7/2023  | Karmoose ............ H04W 76/20 |
| 2023/0309091 | A1* | 9/2023  | Rico Alvarino ...... H04L 5/0044 |
| 2023/0354358 | A1* | 11/2023 | Bhamri ................ H04B 7/0602 |
| 2024/0137958 | A1* | 4/2024  | Cao ........................ H04L 5/0044 |
| 2024/0389129 | A1* | 11/2024 | Rastegardoost .. H04W 72/0453 |
| 2025/0031195 | A1* | 1/2025  | Wang .................. H04B 7/0404 |

FOREIGN PATENT DOCUMENTS

| CN | 107734688 A     | 2/2018 |
| WO | WO-2014/021935 A1 | 2/2014 |
| WO | WO-2015/026196 A1 | 2/2015 |

OTHER PUBLICATIONS

International Search Report and Written Opinion for PCT Appl. No. PCT/CN2021/071302, mailed Sep. 28, 2021 (8 pages).
ZTE Corporation: "Remaining Issues on Support of Tx Switching between Two Uplink Carriers" 3GPP TSG RAN WG1 Meeting #101-e; R1-2003332; Jun. 5, 2020; e-Meeting (15 pages).
(Continued)

*Primary Examiner* — Yu-Wen Chang
(74) *Attorney, Agent, or Firm* — Foley & Lardner LLP

(57) ABSTRACT

A wireless communication method includes determining, by a wireless communication device, a first carrier corresponding to a first frequency resource and a second carrier corresponding to a second frequency resource, and determining, by the wireless communication device, whether to transmit a third transmission during a time interval based on a first transmission, a second transmission and an operation state, the second transmission being transmitted before the first transmission is to be transmitted.

16 Claims, 20 Drawing Sheets

(56) References Cited

OTHER PUBLICATIONS

3rd Generation Partnership Project; Technical Specification Group Radio Access Network; NR; Physical layer procedures for data (Release 16), 3GPP TS 38.214, V16.4.0, Dec. 2020 (169 pages).
CMCC, "UL Tx switching related RF requirements for R17 new scenarios", 3GPP TSG-RAN WG4 meeting # 97-e, R4-2014739, Nov. 13, 2020, Electronic Meeting (5 pages).
Extended European Search Report for EP Appl. No. 21918195.5, dated Jan. 3, 2024 (12 pages).
Huawei et al., "Discussion on the introduction of 2Tx-2Tx UE uplink switch", 3GPP TSG RAN4 Meeting #97e, R4-2015283, Nov. 13, 2020, Electronic Meeting (4 pages).
Moderator (China Telecom), "Summary#2 of uplink Tx switching", 3GPP TSG RAN WG1 #100bis, R1-2002724, Apr. 30, 2020, e-Meeting (16 pages).
ZTE Corporation, "Initial considerations on 2Tx switching between 2 carriers", 3GPP TSG-RAN WG4 Meeting #97-e, R4-2015182, Nov. 13, 2020, Electronic Meeting (3 pages).

* cited by examiner

SYSTEMS AND METHODS FOR UPLINK TRANSMISSION SWITCHING

CROSS-REFERENCE TO RELATED APPLICATION

This application claims the benefit of priority under 35 U.S.C. § 120 as a continuation of PCT Patent Application No. PCT/CN2021/071302, filed on Jan. 12, 2021, the disclosure of which is incorporated herein by reference in its entirety.

TECHNICAL FIELD

The disclosure relates generally to wireless communications and, more particularly, to systems and methods for uplink transmission switching.

BACKGROUND

Uplink (UL) Transmission (Tx) switching was introduced in 3GPP New Radio (NR) Release-16 specifications for inter-band Carrier Aggregation (CA), standalone Supplementary Uplink (SUL), and E-UTRA NR Dual Connectivity (EN-DC). However, the UL Tx switching defined in Release-16 is limited to the case in which two UL carriers are configured, but one UL carrier is only capable of supporting one transmit antenna connector while the other UL carrier is capable of supporting two transmit antenna connectors.

In an exemplary scenario involving inter-band CA, if the User Equipment (UE) is configured to two UL carriers from different bands (e.g., carrier1 and carrier2), carrier1 is only capable of supporting one transmit antenna connector and carrier2 is capable of supporting two transmit antenna connectors. Theoretically, in order to maximize the system throughout, three transmit antennas are needed for each UE (i.e., one transmit antenna for carrier1 and two transmit antennas for carrier2). However, it is not currently practical to equip UEs with three transmit antennas due to technical constraints (e.g., interference between transmit antennas), cost budget, and form fact. As such, most current UEs are only equipped with two transmit antennas (i.e., carrier1 and carrier2 are each equipped with one transmit antenna).

UL Tx switching is adopted in order to increase the system throughput by allowing the antenna for carrier1 to switch between carrier1 and carrier2. For example, if there is only traffic on carrier1, the UE can keep on transmit antenna for carrier1 and another transmit antenna for carrier2. Alternatively, if there is high traffic on carrier2, the UE can switch the transmit antenna for carrier1 to carrier2 such that both antennas are reserved for carrier2. UE switches the transmit antenna between carrier1 and carrier2 according to the network's configuration and scheduling. Further, not only is the bandwidth of carrier2 usually larger than the bandwidth of carrier1, but also the two transmit antennas for carrier2 can boost the system throughput via UL Multiple Input and Multiple Output (MIMO).

SUMMARY

The example embodiments disclosed herein are directed to solving the issues relating to one or more of the problems presented in the prior art, as well as providing additional features that will become readily apparent by reference to the following detailed description when taken in conjunction with the accompany drawings. In accordance with various embodiments, example systems, methods, devices and computer program products are disclosed herein. It is understood, however, that these embodiments are presented by way of example and are not limiting, and it will be apparent to those of ordinary skill in the art who read the present disclosure that various modifications to the disclosed embodiments can be made while remaining within the scope of this disclosure.

In some arrangements, User Equipment (UE) performs a method including determining a first carrier corresponding to a first frequency resource and a second carrier corresponding to a second frequency resource; and determining whether to transmit a third transmission during a time interval based on a first transmission, a second transmission and an operation state, the second transmission being transmitted before the first transmission is to be transmitted.

In other arrangements, a Base Station (BS) performs a method including configuring, for the UE, a first carrier corresponding to a first frequency resource and a second carrier corresponding to a second frequency resource; and communicating using one or more of the first carrier or the second carrier, wherein whether to receive a third transmission during a time interval is determined based on a first transmission, a second transmission, and an operation state, the second transmission being received before the first transmission is to be received.

In other embodiments, a wireless communications apparatus comprising a processor and a memory, wherein the processor is configured to read code from the memory and implement a method including determining a first carrier corresponding to a first frequency resource and a second carrier corresponding to a second frequency resource; and determining whether to transmit a third transmission during a time interval based on a first transmission, a second transmission and an operation state, the second transmission being transmitted before the first transmission is to be transmitted.

In other embodiments, a computer program product comprising a computer-readable program medium code stored thereupon, the code, when executed by a processor, causing the processor to implement a method including determining a first carrier corresponding to a first frequency resource and a second carrier corresponding to a second frequency resource; and determining whether to transmit a third transmission during a time interval based on a first transmission, a second transmission and an operation state, the second transmission being transmitted before the first transmission is to be transmitted.

The above and other aspects and their implementations are described in greater detail in the drawings, the descriptions, and the claims.

BRIEF DESCRIPTION OF THE DRAWINGS

Various example embodiments of the present solution are described in detail below with reference to the following figures or drawings. The drawings are provided for purposes of illustration only and merely depict example embodiments of the present solution to facilitate the reader's understanding of the present solution. Therefore, the drawings should not be considered limiting of the breadth, scope, or applicability of the present solution. It should be noted that for clarity and ease of illustration, these drawings are not necessarily drawn to scale.

DETAILED DESCRIPTION

Figures 1A, 1B:
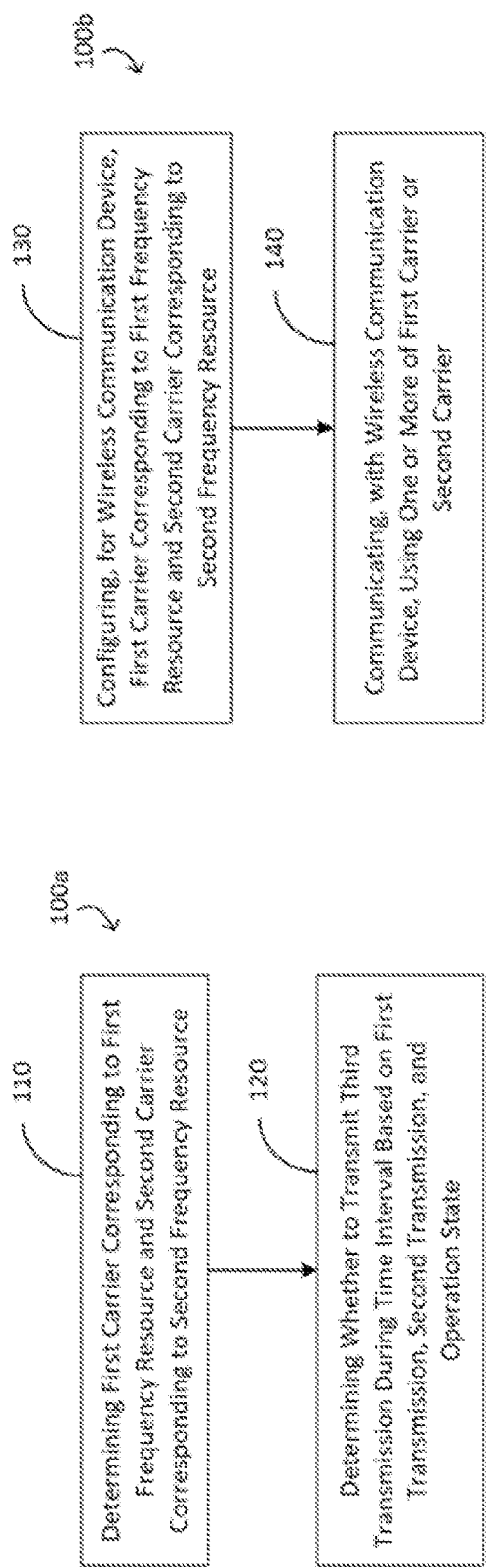
FIG. 1A is a flowchart diagram illustrating an example wireless communication method for uplink transmission switching, according to various arrangements.
FIG. 1B is a flowchart diagram illustrating an example wireless communication method for uplink transmission switching, according to various arrangements.

Various example embodiments of the present solution are described below with reference to the accompanying figures to enable a person of ordinary skill in the art to make and use the present solution. As would be apparent to those of ordinary skill in the art, after reading the present disclosure, various changes or modifications to the examples described herein can be made without departing from the scope of the present solution. Thus, the present solution is not limited to the example embodiments and applications described and illustrated herein. Additionally, the specific order or hierarchy of steps in the methods disclosed herein are merely example approaches. Based upon design preferences, the specific order or hierarchy of steps of the disclosed methods or processes can be re-arranged while remaining within the scope of the present solution. Thus, those of ordinary skill in the art will understand that the methods and techniques disclosed herein present various steps or acts in a sample order, and the present solution is not limited to the specific order or hierarchy presented unless expressly stated otherwise.

As discussed, Uplink (UL) Transmission (Tx) switching defined in Release-16 is limited to the case in which two UL carriers are configured, but one UL carrier is only capable of supporting one transmit antenna connector while the other UL carrier is capable of supporting two transmit antenna connectors. Thus, the UL carrier that is only capable of supporting one transmit antenna connector can only support 1-port transmission on it and the UL carrier that is only capable of supporting two transmit antenna connectors can support 1-port or 2-port transmission on it. To further enhance the UL Tx switching defined in Release-16 and to expand cases in which UL Tx switching can be used, one of two methods can be applied. In a first method, both of the two transmit antennas are able to switch between carrier1 and carrier2, such that both carrier1 and carrier2 are capable of supporting two transmit antenna connectors. Thus, both carrier1 and carrier2 can support 1-port or 2-port transmission. In a second method, UL Tx switching is expanded to support a situation in which three carriers are configured.

For this first method, the UE is configured with two uplink carriers (e.g., carrier1 in band X and carrier2 in band Y). Band X and Band Y are New Radio (NR) operating bands as defined in 3GPP RAN4 specifications. The UE can support 1-port transmission and 2-port transmission depending on the UE's capabilities and network configuration. 1-port transmission is one of Physical Random Access Channel (PRACH), Physical Uplink Control Channel (PUCCH), Sounding Reference Signal (SRS) that corresponds to one antenna port, or a Physical Uplink Shared Channel (PUSCH) that corresponds to one antenna port. 2-port transmission is one of an SRS that corresponds to two antenna ports or a PUSCH that corresponds to two antenna ports. In different operation states, the UE may support different transmissions on carrier1 and carrier2. In order to support transmissions in different operation states, UE needs to switch transmit antenna(s) between carrier1 and carrier2. The duration of time for the UE to switch transmit antenna (s) from carrier1 to carrier2 (or from carrier2 to carrier1) is defined as $N_{TX1-TX2}$. The value of time duration $N_{TX1-TX2}$ is dependent on the UE's capability, and can be the same or different for different embodiments described herein.

In a first embodiment utilizing this first method, two operation states are defined for the UE, such that the UE may support different transmissions on carrier1 and carrier2. In some embodiments of this first embodiment, in the first operation state, the UE supports transmitting 1-port and 2-port transmission on UL carrier2, and in the second operation state, the UE supports transmitting 1-port and 2-port transmission on UL carrier1. When the UE is to transmit a 1-port or 2-port transmission on one UL carrier and if the preceding UL transmission was a 1-port or 2-port transmission on another UL carrier, then the UE is not expected to transmit for the duration of $N_{TX1-TX2}$ on any of the two carriers. As used herein, the UE is not expected to transmit for a given duration (e.g., the duration of $N_{TX1-TX2}$) as described relative to any applicable arrangement means that the UE is not expected to transmit a specific transmission for the duration of $N_{TX1-TX2}$, or that the UE is not expected to transmit any transmission for the duration of $N_{TX1-TX2}$. This specific transmission may be the intended transmission above (i.e., the 1-port or 2-port transmission on one UL carrier), or may be another separate transmission, and this specific transmission may be one of PUSCH, PUCCH, PRACH, or SRS.

When the UE is to transmit a transmission on one uplink carrier and if the preceding UL transmission was a transmission on another UL carrier, then the UE is not expected to transmit for the duration of $N_{TX1-TX2}$ on any of the two carriers. When the UE is to transmit a 1-port or 2-port transmission on UL carrier1 and if the preceding UL transmission was a 1-port or 2-port transmission on UL carrier2, then the UE is not expected to transmit for the duration of $N_{TX1-TX2}$ on any of the two carriers. When the UE is to transmit a 1-port of 2-port transmission on UL carrier2 and if the preceding UL transmission was a 1-port or 2-port transmission on UL carrier1, then the UE is not expected to transmit for the duration of $N_{TX1-TX2}$ on any of the two carriers. When the UE is to transmit a 2-port transmission on UL carrier2 and if the preceding UL transmission was a 2-port transmission on UL carrier1, then the UE is not expected to transmit for the duration of $N_{TX1-TX2}$ on any of the two carriers. When the UE is to transmit a 2-port transmission on UL carrier1 and if the preceding UL transmission was a 2-port transmission on UL carrier2, then the UE is not expected to transmit for the duration of $N_{TX1-TX2}$ on any of the two carriers.

In a second embodiment for this first method, three operation states are defined for the UE. In some embodiments of this second embodiment, in the first operation state, the UE supports transmitting 1-port transmission on UL carrier1, 1-port transmission on UL carrier2, and 1-port transmissions on both UL carrier1 and UL carrier2. In the second operation state, the UE supports transmitting 2-port transmission on UL carrier2, and in the third operation state, the UE supports transmitting 2-port transmission on UL carrier1. When the UE is to transmit a 2-port transmission on one UL carrier and if the preceding UL transmission is a 1-port transmission on the same or another UL carrier, then the UE is not expected to transmit for the duration of $N_{TX1-TX2}$ on any of the two carriers. When the UE is to transmit a1-port transmission on one UL carrier and if the preceding UL transmission is a 2-port transmission on the same or another UL carrier, then the UE is not expected to transmit for the duration of $N_{TX1-TX2}$ on any of the two carriers. When the UE is to transmit a 2-port transmission on one UL carrier and if the preceding UL transmission was a 2-port transmission on another UL carrier, then the UE is not expected to transmit for the duration of $N_{TX1-TX2}$ on any of the two carriers. When the UE is to transmit a 2-port transmission on UL carrier2 and if the preceding UL transmission was a 1-port transmission on UL carrier1 or carrier2, then the UE is not expected to transmit for the duration of $N_{TX1-TX2}$ on any of the two carriers. When the UE is to transmit a 2-port transmission on UL carrier2 and if the preceding UL transmissions were a 1-port transmission on UL carrier1 and a 1-port transmission on UL carrier2, then the UE is not expected to transmit for the duration of $N_{TX1-TX2}$ on any of the two carriers. When the UE is to transmit a 2-port transmission on UL carrier1 and if the preceding UL transmission was a 1-port transmission on UL carrier1 or carrier2, then the UE is not expected to transmit for the duration of $N_{TX1-TX2}$ on any of the two carriers. When the UE is to transmit a 2-port transmission on UL carrier1 and if the preceding UL transmissions were a 1-port transmission on UL carrier1 and a 1-port transmission on UL carrier2, then the UE is not expected to transmit for the duration of $N_{TX1-TX2}$ on any of the two carriers. When the UE is to transmit a 2-port transmission on UL carrier2 and if the preceding UL transmission was a 2-port transmission on UL carrier1, then the UE is not expected to transmit for the duration of $N_{TX1-TX2}$ on any of the two carriers. When the UE is to transmit a 2-port transmission on UL carrier1 and if the preceding UL transmission was a 2-port transmission on UL carrier2, then the UE is not expected to transmit for the duration of $N_{TX1-TX2}$ on any of the two carriers.

In a third embodiment of the first method, three operation states are defined for the UE. In some embodiments of this third embodiment, in the first operation state, the UE supports transmitting 1-port transmissions on UL carrier1, 1-port transmissions on UL carrier2, and 1-port transmission on carrier1 and on carrier2 simultaneously. In the second operation state, the UE supports transmitting 1-port and 2-port transmissions on UL carrier 2, and in the third operation state, the UE supports transmitting 1-port and 2-port transmissions on UL carrier1. When the UE is to transmit a 1-port or 2-port transmission on one UL carrier and if the preceding UL transmission was a 1-port or 2-port transmission on another UL carrier, then the UE is not expected to transmit for the duration of $N_{TX1-TX2}$ on any of the two carriers. When the UE is to transmit a 1-port or 2-port on one UL carrier and if the preceding UL transmissions were a 1-port transmission on the same UL carrier and a 1-port transmission on another UL carrier, then the UE is not expected to transmit for the duration of $N_{TX1-TX2}$ on any of the two carriers. When the UE is to transmit a 1-port transmission on one carrier and a 1-port transmission on another carrier, and if the preceding UL transmission was a 1-port or 2-port transmission on one of the two UL carriers, then the UE is not expected to transmit for the duration of $N_{TX1-TX2}$ on any of the two carriers. When the UE is to transmit a 1-port or 2-port transmission on UL carrier2 and if the preceding UL transmissions were a 1-port transmission on UL carrier1 and a 1-port transmission on UL carrier2, then the UE is not expected to transmit for the duration of $N_{TX1-TX2}$ on any of the two carriers. When the UE is to transmit a 1-port transmission on UL carrier1 and a 1-port transmission on UL carrier2, and if the preceding UL transmission was a 1-port or 2-port transmission on UL carrier1, then the UE is not expected to transmit for the duration of $N_{TX1-TX2}$ on any of the two carriers. When the UE is to transmit a 1-port or 2-port transmission on UL carrier1 and if the preceding UL transmissions were a 1-port transmission on UL carrier1 and a 1-port transmission on UL carrier2, then the UE is not expected to transmit for the duration of $N_{TX1-TX2}$ on any of the two carriers. When the UE is to transmit a 1-port transmission on UL carrier1 and a 1-port transmission on UL carrier2, and if the preceding UL transmission was a 1-port or 2-port transmission on UL carrier2, then the UE is not expected to transmit for the duration of $N_{TX1-TX2}$ on any of the two carriers. When the UE is to transmit a 1-port or 2-port transmission on UL carrier1 and if the preceding UL transmission was a 1-port or 2-port transmission on UL carrier2, then the UE is not expected to transmit for the duration of $N_{TX1-TX2}$ on any of the two carriers. When the UE is to transmit a 1-port or 2-port transmission on UL carrier2 and if the preceding UL transmission was a 1-port or 2-port transmission on UL carrier1, then the UE is not expected to transmit for the duration of $N_{TX1\text{-}TX2}$ on any of the two carriers.

In a fourth embodiment of the first method, three operation states are defined for the UE. In some embodiments of this fourth embodiment, in the first operation state, the UE supports 1-port transmission on UL carrier1, 1-port transmission on UL carrier2, and 1-port transmission on UL carrier1 and on UL carrier2 simultaneously. In the second operation state, the UE supports transmitting 1-port and 2-port transmission on UL carrier2, and in the third operation state, the UE supports transmitting 1-port and 2-port transmission on UL carrier1. When the UE is to transmit a 1-port or 2-port transmission on one UL carrier, if the preceding UL transmission was a 1-port or 2-port transmission on another UL carrier, and if the UE is under an operation state in which 2-port transmission can be supported on the other UL carrier (e.g., either the second or the third operation state), then the UE is not expected to transmit for the duration of $N_{TX1\text{-}TX2}$ on any of the two carriers. When the UE is to transmit a 2-port transmission on one UL carrier, if the preceding UL transmission was a 1-port transmission on the same or another UL carrier, and if the UE is under an operation state in which 2-port transmission cannot be supported in any of the two carriers (i.e., the first operation state), then the UE is not expected to transmit for the duration of $N_{TX1\text{-}TX2}$ on any of the two carriers. When the UE is to transmit a 1-port transmission on one UL carrier and a 1-port transmission on another carrier, if the preceding UL transmission was a 1-port or 2-port transmission on one of the two UL carriers, and if the UE is under an operation state in which 2-port transmission can be support in the transmitting carrier (i.e., the second or the third operation state), then the UE is not expected to transmit for the duration of $N_{TX1\text{-}TX2}$ on any of the two carriers. When the UE is to transmit a 2-port transmission on UL carrier2 and if the preceding UL transmissions were a 1-port transmission on carrier1 and a 1-port transmission on UL carrier2, then the UE is not expected to transmit for the duration of $N_{TX1\text{-}TX2}$ on any of the two carriers. When the UE is to transmit a 2-port transmission on UL carrier2, if the preceding UL transmission was a 1-port transmission on UL carrier1 or UL carrier2, and if the UE is in the first operation state, then the UE is not expected to transmit for the duration of $N_{TX1\text{-}TX2}$ on any of the two carriers. When the UE is to transmit a 1-port transmission on UL carrier1 and a 1-port transmission on UL carrier2, if the preceding UL transmission was a 1-port transmission on UL carrier2, and if the UE is in the second operation state, then the UE is not expected to transmit for the duration of $N_{TX1\text{-}TX2}$ on any of the two carriers. When the UE is to transmit a 1-port transmission on UL carrier1 and a 1-port transmission on UL carrier2 and if the preceding UL transmission was a 2-port transmission on UL carrier2, then the UE is not expected to transmit for the duration of $N_{TX1\text{-}TX2}$ on any of the two carriers. When the UE is to transmit a 2-port transmission on UL carrier1 and if the preceding UL transmissions were a 1-port transmission on UL carrier1 and a 1-port transmission on UL carrier2, then the UE is not expected to transmit for the duration of $N_{TX1\text{-}TX2}$ on any of the two carriers. When the UE is to transmit a 2-port transmission on UL carrier1, if the preceding UL transmission was a 1-port transmission on UL carrier1 or UL carrier2, and if the UE is in the first operation state, then the UE is not expected to transmit for the duration of $N_{TX1\text{-}TX2}$ on any of the two carriers. When the UE is to transmit a 1-port transmission on UL carrier1 and a 1-port transmission on UL carrier2, if the preceding UL transmission was a 1-port transmission on UL carrier1, and if the UE is in the third operation state, then the UE is not expected to transmit for the duration of $N_{TX1\text{-}TX2}$ on any of the two carriers. When the UE is to transmit a 1-port transmission on UL carrier1 and a 1-port transmission on UL carrier2 and if the preceding UL transmission was a 2-port transmission on UL carrier1, then the UE is not expected to transmit for the duration of $N_{TX1\text{-}TX2}$ on any of the two carriers. When the UE is to transmit a 1-port or 2-port transmission on UL carrier2, if the preceding UL transmission was a 1-port or 2-port transmission on UL carrier1, and if the UE is in the third operation state, then the UE is not expected to transmit for the duration of $N_{TX1\text{-}TX2}$ on any of the two carriers. When the UE is to transmit a 1-port or 2-port transmission on UL carrier1, if the preceding UL transmission was a 1-port or 2-port transmission on UL carrier2, and if the UE is in the second operation state, then the UE is not expected to transmit for the duration of $N_{TX1\text{-}TX2}$ on any of the two carriers.

In a fifth embodiment of the first method, three operation states are defined for the UE. In some embodiments of this fifth embodiment, in the first operation state, the UE supports 1-port transmission on UL carrier and if the preceding UL transmission was a 2-port transmission on another UL carrier, then the UE is not expected to transmit for the duration of $N_{TX1\text{-}TX2}$ on any of the two carriers. When the UE is to transmit a 2-port transmission on one UL carrier, if the preceding UL transmission was a 1-port transmission on the same or another UL carrier, and if the UE is under an operation state in which 2-port transmission cannot be supported in any of the two carriers (i.e., the first operation state), then the UE is not expected to transmit for the duration of $N_{TX1\text{-}TX2}$ on any of the two carriers. When the UE is to transmit a 1-port transmission on one UL carrier, if the preceding UL transmission was a 1-port or 2-port transmission on another UL carrier, and if the UE is under an operation state in which 2-port transmission can be supported in either of the two carriers (i.e., the second or third operation states), then the UE is not expected to transmit for the duration of $N_{TX1\text{-}TX2}$ on any of the two carriers. When the UE is to transmit a 2-port transmission on UL carrier2 and if the transmissions were a 1-port transmission on UL carrier1 and a 1-port transmission on UL carrier2, then the UE is not expected to transmit for the duration of $N_{TX1\text{-}TX2}$ on any of the two carriers. When the UE is to transmit a 2-port transmission on UL carrier2, if the preceding UL transmission was a 1-port transmission on UL carrier1 or UL carrier2, and if the UE is in the first operation state, then the UE is not expected to transmit for the duration of $N_{TX1\text{-}TX2}$ on any of the two carriers. When the UE is to transmit a 1-port transmission on UL carrier1 and a 1-port transmission on UL carrier2, if the preceding UL transmission was a 1-port transmission on UL carrier2, and if the UE is in the second operation state, then the UE is not expected to transmit for the duration of $N_{TX1\text{-}TX2}$ on any of the two carriers. When the UE is to transmit a 1-port transmission on UL carrier1 and a 1-port transmission on UL carrier2 and if the preceding UL transmission was a 2-port transmission on UL carrier2, then the UE is not expected to transmit for the duration of $N_{TX1\text{-}TX2}$ on any of the two carriers. When the UE is to transmit a 1-port transmission on UL carrier1, if the preceding UL transmission was a 1-port transmission on UL carrier2, and if the UE is in the second operation state, then the UE is not expected to transmit for the duration of $N_{TX1\text{-}TX2}$ on any of the two carriers. When the UE is to transmit a 1-port transmission on UL carrier1 and if the preceding UL transmission was a 2-port transmission on UL carrier2, then the UE is not expected to transmit for the duration of $N_{TX1\text{-}TX2}$ on any of the two carriers. When the UE is to transmit a 2-port transmission on UL carrier1 and if the preceding UL transmissions were a 1-port transmission on UL carrier1 and a 1-port transmission on UL carrier2, then the UE is not expected to transmit for the duration of $N_{TX1\text{-}TX2}$ on any of the two carriers. When the UE is to transmit a 2-port transmission on UL carrier1, if the preceding UL transmission was a 1-port transmission on UL carrier1 or UL carrier 2, and if the UE is in the first operation state, then the UE is not expected to transmit for the duration of $N_{TX1\text{-}TX2}$ on any of the two carriers. When the UE is to transmit a 1-port transmission on UL carrier1 and a 1-port transmission on UL carrier2, if the preceding UL transmission was a 1-port transmission on UL carrier1, and if the UE is in the third operation state, then the UE is not expected to transmit for the duration of $N_{TX1\text{-}TX2}$ on any of the two carriers. When the UE is to transmit a 1-port transmission on UL carrier1 and a 1-port transmission on UL carrier2 and if the preceding UL transmission was a 2-port transmission on UL carrier1, then the UE is not expected to transmit for the duration of $N_{TX1\text{-}TX2}$ on any of the two carriers. When the UE is to transmit a 1-port transmission on UL carrier2, if the preceding UL transmission was a 1-port transmission on UL carrier1, and if the UE is in the third operation state, then the UE is not expected to transmit for the duration of $N_{TX1\text{-}TX2}$ on any of the two carriers. When the UE is to transmit a 1-port transmission on UL carrier2 and if the preceding UL transmission was a 2-port transmission on UL carrier1, then the UE is not expected to transmit for the duration of $N_{TX1\text{-}TX2}$ on any of the two carriers. When the UE is to transmit a 2-port transmission on UL carrier2, if the preceding UL transmission was a 1-port or 2-port transmission on UL carrier1, and if the UE is in the third operation state, then the UE is not expected to transmit for the duration of $N_{TX1\text{-}TX2}$ on any of the two carriers. When the UE is to transmit a 2-port transmission on UL carrier1, if the preceding UL transmission was a 1-port or 2-port transmission on UL carrier2, and if the preceding UL transmission was a 1-port or 2-port transmission on UL carrier2, and if the UE is in the second operation state, then the UE is not expected to transmit for the duration of $N_{TX1\text{-}TX2}$ on any of the two carriers.

In a sixth embodiment of the first method, three operation states are defined for the UE. In some embodiments of this sixth embodiment, in a first operation state, the UE supports transmitting 1-port transmission on UL carrier1, and 1-port transmission on UL carrier1 and carrier2 simultaneously. In a second operation state, the UE supports transmitting 1-port and 2-port transmission on UL carrier2, and in a third operation state, the UE supports transmitting 2-port transmission on UL carrier1. When the UE is to transmit 1-port or 2-port transmission on UL carrier 2 and if the preceding UL transmission was a 1-port or 2-port transmission on UL carrier1, then the UE is not expected to transmit for the duration of $N_{TX1\text{-}TX2}$ on any of the two carriers. When the UE is to transmit a 1-port or 2-port transmission on UL carrier1 and if the preceding UL transmission was a 1-port or 2-port transmission on UL carrier2, then the UE is not expected to transmit for the duration of $N_{TX1\text{-}TX2}$ on any of the two carriers. When the UE is to transmit a 2-port transmission on UL carrier1 and if the preceding UL transmission was a 1-port transmission on UL carrier1, then the UE is not expected to transmit for the duration of $N_{TX1\text{-}TX2}$ on any of the two carriers. When the UE is to transmit a 1-port transmission on carrier1 and if the preceding UL transmission was a 2-port transmission on UL carrier1, then the UE is not expected to transmit for the duration of $N_{TX1\text{-}TX2}$ on any of the two carriers. When the UE is to transmit a 2-port transmission on UL carrier1 or UL carrier2 and if the preceding UL transmissions were a 1-port transmission on carrier1 and a 1-port transmission on carrier2, then the UE is not expected to transmit for the duration of $N_{TX1\text{-}TX2}$ on any of the two carriers. When the UE is to transmit a 1-port transmission on UL carrier1 and a 1-port transmission on UL carrier2 and if the preceding UL transmission was a 2-port transmission on UL carrier1 or UL carrier2, then the UE is not expected to transmit for the duration of $N_{TX1\text{-}TX2}$ on any of the two carriers. When the UE is to transmit a 1-port or 2-port transmission on UL carrier2 and if the preceding UL transmissions were a 1-port transmission on UL carrier1 and a 1-port transmission on UL carrier2, then the UE is not expected to transmit for the duration of $N_{TX1\text{-}TX2}$ on any of the two carriers. When the UE is to transmit a 1-port or 2-port transmission on UL carrier2 and if the preceding UL transmission was a 1-port transmission on UL carrier1, then the UE is not expected to transmit for the duration of $N_{TX1\text{-}TX2}$ on any of the two carriers. When the UE is to transmit a 1-port transmission on UL carrier1 and a 1-port transmission on UL carrier2 and if the preceding UL transmission was a 1-port or 2-port transmission on UL carrier2, then the UE is not expected to transmit for the duration of $N_{TX1\text{-}TX2}$ on any of the two carriers. When the UE is to transmit a 1-port transmission on UL carrier1 and if the preceding UL transmission was a 1-port or 2-port transmission on UL carrier2, then the UE is not expected to transmit for the duration of $N_{TX1\text{-}TX2}$ on any of the two carriers. When the UE is to transmit a 2-port transmission on UL carrier1 and if the preceding UL transmissions were a 1-port transmission on UL carrier1 and a 1-port transmission on UL carrier2, then the UE is not expected to transmit for the duration of $N_{TX1\text{-}TX2}$ on any of the two carriers. When the UE is to transmit a 2-port transmission on UL carrier1 and if the preceding UL transmission was a 1-port transmission on UL carrier1, then the UE is not expected to transmit for the duration of $N_{TX1\text{-}TX2}$ on any of the two carriers. When the UE is to transmit a 1-port transmission on UL carrier2 and if the preceding UL transmission was a 2-port transmission on UL carrier1, then the UE is not expected to transmit for the duration of $N_{TX1\text{-}TX2}$ on any of the two carriers. When the UE is to transmit 1-port transmission on UL carrier1 and if the preceding UL transmission was a 2-port transmission on UL carrier1, then the UE is not expected to transmit for the duration of $N_{TX1\text{-}TX2}$ on any of the two carriers. When the UE is to transmit a 2-port transmission on UL carrier1 and if the preceding UL transmission was a 1-port or 2-port transmission on UL carrier2, then the UE is not expected to transmit for the duration of $N_{TX1\text{-}TX2}$ on any of the two carriers. When the UE is to transmit a 1-port or 2-port transmission on UL carrier2 and if the preceding UL transmission was a 2-port transmission on UL carrier1, then the UE is not expected to transmit for the duration of $N_{TX1\text{-}TX2}$ on any of the two carriers.

In a seventh embodiment of the first method, three operation states are defined for the UE. In some embodiments of this seventh embodiment, in a first operation state, the UE supports transmitting 1-port transmission on UL carrier1, 1-port transmission on UL carrier2, and 1-port transmission on UL carrier1 and UL carrier 2 simultaneously. In a second operation state, the UE supports transmitting 1-port and 2-port transmission on UL carrier2, and in a third operation state, the UE supports transmitting 1-port and 2-port transmission on UL carrier1. When the UE is to transmit a 1-port transmission on a first UL carrier, if the preceding UL transmission was a 1-port or 2-port transmission on a second UL carrier, and if the UE is under an operation state in which 2-port transmission can be supported in the second UL carrier (i.e., the second or third operation states), the UE switches to an operation state in which 2-port transmission can be supported on the first UL carrier (i.e., the second or third operation states). When the UE is to transmit a 1-port transmission on the first UL carrier and if the UE is under an operation state in which 2-port transmission can be supported in the second UL carrier (i.e., the second or third operation states), the UE switches to an operation state in which 2-port transmission can be supported on the first UL carrier (i.e., the second or third operation states). In some of these embodiments, the first UL carrier is UL carrier1 and the second UL carrier is UL carrier2. In other of these embodiments, the first UL carrier is UL carrier2 and the second UL carrier is UL carrier1. For example, if the UE is under the third operation state and is to transmit a 1-port transmission on carrier2, then the UE switches to the second operation state. In another example, if the UE is under the second operation state and the UE is to transmit a 1-port transmission on carrier1, then the UE switches to the third operation state.

In an eighth embodiment of the first method, three operation states are defined for the UE. In some embodiments of this eighth embodiment, in a first operation state, the UE supports 1-port transmission on UL carrier1, 1-port transmission on UL carrier2, and 1-port transmission on carrier1 and carrier2 simultaneously. In a second operation state, the UE supports transmitting 1-port and 2-port transmissions on UL carrier2, and in a third operation state, the UE supports transmitting 1-port and 2-port transmissions on UL carrier1. When the UE is to transmit a 1-port transmission the first UL carrier, if the preceding UL transmission was a 1-port or 2-port transmission on the second UL carrier, and if the UE is under the operation state in which 2-port transmission can be supported in the second UL carrier (i.e., the second or third operation states), the UE switches to an operation state in which 2-port transmission cannot be supported in any of the two UL carriers (i.e., the first operation state). When the UE is to transmit a 1-port transmission in the first UL carrier and if the UE is under an operation state in which 2-port transmission can be supported in the second UL carrier (i.e., the second or third operation states), the UE switches to an operation state in which 2-port transmission cannot be supported on any of the two UL carriers (i.e., the first operation state). In some of these embodiments, the first UL carrier is UL carrier1 and the second UL carrier is UL carrier2. In other of these embodiments, the first UL carrier is UL carrier2 and the second UL carrier is UL carrier1. For example, if the UE is under the third operation state and is to transmit a 1-port transmission on carrier2, then the UE switches to the first operation state. In another example, if the UE is under the second operation state and is to transmit a 1-port transmission on carrier1, then the UE switches to the first operation state.

In a ninth embodiment of the first method, three operation states are defined for the UE. In some embodiments of this ninth embodiment, in a first operation state, the UE supports transmitting 1-port transmission on UL carrier1, 1-port transmission on UL carrier2, and 1-port transmission on UL carrier1 and UL carrier2 simultaneously. In a second operation state, the UE supports transmitting 1-port and 2-port transmissions on UL carrier2, and in a third operation state, the UE supports transmitting 1-port and 2-port transmissions on UL carrier1. When the UE is to transmit a 1-port transmission on carrier2, if the preceding transmission was a 1-port or 2-port transmission on carrier1, and if the UE is under an operation state in which 2-port transmission can be supported on carrier1 (i.e., the third operation state), the UE switches to an operation state in which 2-port transmission cannot be supported on any of the two UL carriers (i.e., the first operation state). When the UE is to transmit a 1-port transmission on carrier1, if the preceding transmission was a 1-port or 2-port transmission on carrier2, and if the UE is under an operation state in which 2-port transmission can be supported on carrier2 (i.e., the second operation state), the UE switches to an operation state in which 2-port transmission can be supported on UL carrier1 (i.e., the third operation state). For example, if the UE is under than third operation state and is to transmit a 1-port transmission on carrier2, then the UE switches to the first operation state. In another example, if the UE is under the second operation state and is to transmit a 1-port transmission on carrier1, then the UE switches to the third operation state.

In a tenth embodiment of the first method, three operation states are defined for the UE. In some embodiments of this tenth embodiment, in a first operation state, the UE supports transmitting 1-port transmissions on UL carrier1, 1-port transmission on UL carrier2, and 1-port transmissions on carrier1 and carrier2 simultaneously. In a second operation state, the UE supports transmitting 1-port and 2-port transmissions on UL carrier2, and in a third operation state, the UE supports transmitting 1-port and 2-port transmissions on UL carrier 1. When the UE is to transmit a 1-port transmission on carrier1, if the preceding transmission was a 1-port or 2-port transmission on carrier2, and if the UE is under an operation state in which 2-port transmission can be supported on carrier2 (i.e., the second operation state), the UE switches to an operation state in which 2-port transmission cannot be supported on any of the two UL carriers (i.e., the first operation state). When the UE is to transmit a 1-port transmission on carrier2, if the preceding transmission was a 1-port or 2-port transmission on carrier1, and if the UE is under an operation state in which 2-port transmission can be supported on carrier1 (i.e., the third operation state), the UE switches to an operation state in which 2-port transmission can be supported on UL carrier2. For example, if the UE is under the third operation state and is to transmit a 1-port transmission on UL carrier2, then the UE switches to the second operation state. In another example, if the UE is under the second operation state and is to transmit a 1-port transmission on UL carrier1, then the UE switches to the first operation state.

In an eleventh embodiment of the first method, three operation states are defined for the UE. These three operation states are defined similarly as to in the seventh, eighth, ninth, and tenth embodiments, such that in a first operation state, the UE supports transmitting 1-port transmissions on UL carrier1, 1-port transmission on UL carrier2, and 1-port transmissions on carrier1 and carrier2 simultaneously. In a second operation state, the UE supports transmitting 1-port and 2-port transmissions on UL carrier2, and in a third operation state, the UE supports transmitting 1-port and 2-port transmissions on UL carrier 1. Further, the rules for the UE to switch between these operation states are similar to those in the seventh, eighth, ninth, and tenth embodiments. In some embodiments of this eleventh embodiment, the network configures these rules for the UE via RRC signaling. In other embodiments, the network indicates these rules for the UE via Downlink Control Information (DCI) or Medium Access Control-Control Element (MAC-CE).

In a twelfth embodiment of the first method, three operation states are defined for the UE. In some embodiments of this twelfth embodiment, in a first operation state, the UE supports transmitting 1-port transmission on UL carrier1, 1-port transmission on UL carrier2, and 1-port transmissions on UL carrier1 and UL carrier2 simultaneously. In a second operation state, the UE supports transmitting 1-port and 2-port transmissions on UL carrier2, and in a third operation state, the UE supports transmitting 1-port and 2-port transmissions on UL carrier1. When the UE is to transmit a 1-port transmission on carrier1, if the preceding transmission was a 1-port or 2-port transmission on carrier2, and if the UE is under an operation state in which 2-port transmission can be supported carrier (i.e., the second operation state), then: 1) if the UL phase of carrier1 in which the 1-port transmission is to be transmitted overlaps in time with a UL symbol of carrier2, the UE switches to an operation state in which 2-port transmission cannot be supported on any of the two UL carriers (i.e., the first operation state); or 2) if the UL phase of carrier1 in which 1-port transmission is be transmitted does not overlap in time with any UL symbol of carrier2, the UE switches to an operation state in which 2-port transmission can be supported on UL carrier1 (i.e., the third operation state). When the UE is to transmit a 1-port transmission on carrier2, if the preceding transmission was a 1-port or 2-port transmission on carrier1, and if the UE is under an operation state in which 2-port transmission can be supported on carrier1 (i.e., the third operation state), then: 1) if the UL phase of carrier2 in which the 1-port transmission is to be transmitted overlaps in time with a UL symbol of carrier1, the UE switches to an operation state in which 2-port transmission cannot be supported on any of the two UL carriers (i.e., the first operation state); or 2) if the UL phase of carrier2 in which the 1-port transmission is to be transmitted does not overlap in time with any UL symbol of carrier1, the UE switches to an operation state in which 2-port transmission can be supported on carrier2 (i.e., the second operation state). For example in which the UE is to transmit a 1-port transmission on carrier1 and is under the second operation state, the UE switches to the first operation state if the UL phase of carrier1 in which the 1-port transmission is to be transmitted overlaps in time with a UL symbol of carrier2, or to the third operation state if the UL phase of carrier1 in which the 1-port transmission is to be transmitted does not overlap in time with any UL symbol of carrier2. In another example in which the UE is to transmit a 1-port transmission on carrier2 and is under the third operation state, the UE switches to the first operation state if the UL phase of carrier2 in which the 1-port transmission is to be transmitted overlaps in time with a UL symbol of carrier1, or to the second operation state if the UL phase of carrier2 in which the 1-port transmission is to be transmitted does not overlap in time with any UL symbol of carrier1. As discussed in this embodiment, the UL phase is a duration of time that may be one of a slot, a subframe, all UL symbols in one slot of a configuration period, or all UL symbols and flexible symbols in one slot of the configuration period.

For the second method discussed herein, the UE is configured for three UL carriers: carrier1 in band X, and carrier2 and carrier3 in band Y. Band X and Band Y are NR operating bands defined in 3GPP RAN4 specifications. Here, the UE can support 1-port transmission and 2-port transmission depending on the UE's capabilities and network configuration. 1-port transmission can be PRACH, RUCCH, SRS corresponding to one antenna port, or PUSCH corresponding to one antenna port. 2-port transmission can be SRS corresponding to two antenna ports or PUSCH corresponding to two antenna ports. For this second method, different operation states are defined for the UE. In these different operation states, the UE supports different transmissions on carrier1, carrier2, and carrier3. In order to support transmissions in different operation states, the UE switches transmit antenna(s) among carrier1, carrier2, and carrier3. The time that the UE takes to switch transmit antennas is given as $N_{TX1\text{-}TX2}$, the value of which is dependent on the UE's capability. The value of $N_{TX1\text{-}TX2}$ can be the same or different in each of the following embodiments.

In a first embodiment of the second method (and thirteenth embodiment overall), two operation states are defined for the UE. In some embodiments of this first embodiment, in a first operation state, the UE supports transmitting 1-port transmission on UL carrier1, and in a second operation state, the UE supports transmitting 1-port and 2-port transmissions on UL carrier2 or UL carrier3. When the UE is to transmit a 1-port or 2-port transmission on UL carrier2 or UL carrier 3 and if the preceding UL transmission was a 1-port transmission on UL carrier1, then the UE is not expected to transmit for the duration of $N_{TX1\text{-}TX2}$ on any of the three carriers. When the UE is to transmit a 1-port transmission on UL carrier1 and if the preceding UL transmission was a 1-port or 2-port transmission on UL carrier2 or UL carrier3, then the UE is not expected to transmit for the duration of $N_{TX1\text{-}TX2}$ on any of the three carriers. In other embodiments of this first embodiment, in a first operation state, the UE supports transmitting 1-port transmission on Band A, and in a second operation state, the UE supports transmitting 1-port and 2-port transmission on Band B. When the UE is to transmit a 1-port or 2-port transmission on Band B and if the preceding UL transmission was a 1-port transmission on Band A, then the UE is not expected to transmit for the duration of $N_{TX1\text{-}TX2}$ on any of the three carriers. When the UE is to transmit a 1-port transmission on Band A and if the preceding UL transmission was a 1-port or 2-port transmission on Band B, then the UE is not expected to transmit for the duration of $N_{TX1\text{-}TX2}$ on any of the three carriers.

In a second embodiment of the second method (and a fourteenth embodiment overall), two operation states are defined for the UE. In some embodiments of this second embodiment, in a first operation state, the UE supports transmitting 1-port transmission on UL carrier1 and 1-port transmission on UL carrier3. In a second operation state, the UE supports transmitting 1-port and 2-port transmission on UL carrier2 or UL carrier3. When the UE is to transmit a 1-port or 2-port transmission on UL carrier2 or UL carrier3, and if the preceding UL transmission was a 1-port transmission on UL carrier1, then the UE is not expected to transmit for the duration of $N_{TX1\text{-}TX2}$ on any of the three carriers. When the UE is to transmit a 1-port transmission on UL carrier1, and if the preceding UL transmission was a 1-port or 2-port transmission on UL carrier2 or UL carrier3, then the UE is not expected to transmit for the duration of $N_{TX1\text{-}TX2}$ on any of the three carriers. When the UE is to transmit a 1-port transmission on UL carrier1 and a 1-port transmission on UL carrier3, and if the preceding UL transmission was a 1-port or 2-port transmission on UL carrier2 or UL carrier3, then the UE is not expected to transmit for the duration of $N_{TX1\text{-}TX2}$ on any of the three carriers.

In a third embodiment of the second method (and fifteenth embodiment overall), two operation states are defined for the UE. In some embodiments of the third embodiment, in the first operation state, the UE supports transmitting 1-port transmission on UL carrier1, UL carrier2, and UL carrier3, and in a second operation state, the UE supports transmitting 1-port and 2-port transmission on UL carrier2 and UL carrier3. When the UE is to transmit a 1-port or 2-port transmission on UL carrier2 or UL carrier3, if the preceding UL transmission was a 1-port transmission on UL carrier1, UL carrier2, or UL carrier3, and if the UE is under an operation state in which 2-port transmission cannot be supported in either UL carrier2 or UL carrier3 (i.e., the first operation state), then the UE is not expected to transmit for the duration of $N_{TX1\text{-}TX2}$ on any of the three carriers. When the UE is to transmit a 1-port transmission on UL carrier1, if the preceding UL transmission was a 1-port or 2-port transmission on UL carrier2 or UL carrier3, and if the UE is under an operation state in which 2-port transmission can be supported in UL carrier2 and UL carrier3 (i.e., the second operation state), then the UE is not expected to transmit for the duration of $N_{TX1\text{-}TX2}$ on any of the three carriers. When the UE is to transmit a 1-port transmission on UL carrier1, if the preceding UL transmission was a 1-port or 2-port transmission on UL carrier2 or UL carrier3, and if the UE is under an operation state in which 2-port transmission can be supported on UL carrier2 and UL carrier3 (i.e., the second operation state), then the UE is not expected to transmit for the duration of $N_{TX1\text{-}TX2}$ on any of the three carriers.

In other embodiments of this third embodiment, in a first operation state, the UE supports transmitting 1-port transmission on Band A and Band B, and in a second operation state, the UE supports transmitting 1-port and 2-port transmission on Band B. When the UE is to transmit a 1-port or 2-port transmission on Band B, if the preceding UL transmission was a 1-port transmission on Band A or Band B, and if the UE is under an operation state in which 2-port transmission cannot be supported in Band B (i.e., the first operation state), then the UE is not expected to transmit for the duration of $N_{TX1\text{-}TX2}$ on any of the three carriers. When the UE is to transmit a 1-port transmission on Band A, if the preceding UL transmission was a 1-port or 2-port transmission on Band B, and if the UE is under an operation state in which 2-port transmission can be supported in Band B (i.e., the second operation rate), then the UE is not expected to transmit for the duration of $N_{TX1\text{-}TX2}$ on any of the three carriers.

In a fourth embodiment of the second method (and sixteenth embodiment overall), two operation states are defined for the UE. In some embodiments of this fourth embodiment, in a first operation state, the UE supports transmitting 1-port and 2-port transmission on UL carrier2 and UL carrier3, and in a second operation state, the UE supports transmitting 1-port and 2-port transmission on UL carrier1. When the UE is to transmit a 1-port or 2-port transmission on UL carrier2 or UL carrier3, and if the preceding UL transmission was a 1-port or 2-port transmission on UL carrier 1, then the UE is not expected to transmit for the duration of $N_{TX1\text{-}TX2}$ on any of the three carriers. When the UE is to transmit a 1-port or 2-port transmission on UL carrier1, and if the preceding UL transmission was a 1-port or 2-port transmission on UL carrier2 and UL carrier3, then the UE is not expected to transmit for the duration of $N_{TX1\text{-}TX2}$ on any of the three carriers.

In other embodiments of this fourth embodiment, in a first operation state, the UE supports transmitting 1-port and 2-port transmission on Band B, and in a second operation state, the UE supports transmitting 1-port and 2-port transmission on Band A. When the UE is to transmit a 1-port or a 2-port transmission on Band B, and if the preceding UL transmission was a 1-port or 2-port transmission on Band A, then the UE is not expected to transmit for the duration of $N_{TX1\text{-}TX2}$ on any of the three carriers. When the UE is to transmit a 1-port or 2-port transmission Band A, and if the preceding UL transmission was a 1-port or 2-port transmission on Band B, then the UE is not expected to transmit for the duration of $N_{TX1\text{-}TX2}$ on any of the three carriers.

In a fifth embodiment of the second method (and seventh embodiment overall), three operation states are defined for the UE. In some embodiments, in the first operation state, the UE supports transmitting 1-port transmission on UL carrier1, UL carrier2, and UL carrier3. In a second operation state, the UE supports transmitting 1-port transmission or no transmission on UL carrier 2 and 2-port transmission on UL carrier3, transmitting 2-port transmission on UL carrier2 and 1-port transmission or no transmission on carrier3, and transmitting 2-port transmission on UL carrier2 and 2-port transmission on UL carrier3. In a third operation state, the UE supports transmitting 2-port transmission on UL carrier1. When the UE is to transmit a 2-port transmission on UL carrier2 or UL carrier3, and if the preceding UL transmission was a 2-port transmission on UL carrier1, then the UE is not expected to transmit for the duration of $N_{TX1\text{-}TX2}$ on any of the three carriers. When the UE is to transmit a 2-port transmission on UL carrier1, and if the preceding UL transmission was a 2-port transmission UL carrier2 or carrier3, then the UE is not expected to transmit for the duration of $N_{TX1\text{-}TX2}$ on any of the three carriers. When the UE is to transmit a 2-port transmission on UL carrier1, if the preceding UL transmission was a 1-port transmission on UL carrier1, UL carrier2, or UL carrier3, and if the UE is under an operation state in which 2-port transmission cannot be supported in any carrier (i.e., the first operation state), then the UE is not expected to transmit for the duration of $N_{TX1\text{-}TX2}$ on any of the three carriers. When the UE is to transmit a 2-port transmission on UL carrier2 or UL carrier3, if the preceding UL transmission was a 1-port transmission on UL carrier1, UL carrier2, or UL carrier3, and if the UE is under an operation state in which 2-port transmission cannot be supported in any carrier (i.e., the first operation state), then the UE is not expected to transmit for the duration of $N_{TX1\text{-}TX2}$ on any of the three carriers. When the UE is to transmit a 1-port transmission on UL carrier1, UL carrier2, or UL carrier3, and if the preceding UL transmission was a 2-port transmission on UL carrier1, then the UE is not expected to transmit for the duration of $N_{TX1\text{-}TX2}$ on any of the three carriers. When the UE is to transmit a 1-port transmission on UL carrier1, UL carrier2, or UL carrier2, and if the preceding UL transmission was a 2-port transmission on UL carrier2 or UL carrier3, then the UE is not expected to transmit for the duration of $N_{TX1\text{-}TX2}$ on any of the three carriers.

In other embodiments of this fifth embodiment, in a first operation state, the UE supports transmitting 1-port transmission on Band A and Band B. In a second operation state, the UE supports transmitting 1-port and 2-port transmission on Band B, and in a third operation state, the UE supports transmitting 2-port transmission on Band A. When the UE is to transmit a 2-port transmission on Band B, and if the preceding UL transmission was a 2-port transmission on Band A, then the UE is not expected to transmit for the duration of $N_{TX1\text{-}TX2}$ on any of the three carriers. When the UE is to transmit a 2-port transmission on Band A, and if the preceding UL transmission was a 2-port transmission on Band B, then the UE is not expected to transmit for the duration of $N_{TX1\text{-}TX2}$ on any of the three carriers. When the UE is to transmit a 2-port transmission on Band A, if the preceding UL transmission was a 1-port transmission on Band A or Band B, and if the UE is under an operation state in which 2-port transmission cannot be supported in either Band A or Band B (i.e., the first operation state), then the UE is not expected to transmit for the duration of $N_{TX1-TX2}$ on any of the three carriers. When the UE is to transmit a 2-port transmission on Band B, if the preceding UL transmission was a 1-port transmission on Band A or Band B, and if the UE is under an operation state in which 2-port transmission cannot be supported in either Band A or Band B, then the UE is not expected to transmit for the duration of $N_{TX1-TX2}$ on any of the three carriers. When the UE is to transmit a 1-port transmission on Band A or Band B, and if the preceding UL transmission was a 2-port transmission on UL Band A, then the UE is not expected to transmit for the duration of $N_{TX1-TX2}$ on any of the three carriers. When the UE is to transmit a 1-port transmission on Band A or Band B, and if the preceding UL transmission was a 2-port transmission on Band B, then the UE is not expected to transmit for the duration of $N_{TX1-TX2}$ on any of the three carriers.

In a sixth embodiment of the second method (and eighteenth embodiment overall), three operation states are defined for the UE. In some embodiments of the sixth embodiment, in a first operation state, the UE supports transmitting 1-port transmission on UL carrier1, UL carrier2, and UL carrier3. In a second operation state, the UE supports transmitting 1-port and 2-port transmission on UL carrier2 and UL carrier3, and in a third operation state, the UE supports transmitting 1-port and 2-port transmission on UL carrier1. When the UE is to transmit a 1-port or 2-port transmission on UL carrier1, and if the preceding UL transmission was a 1-port or 2-port transmission on UL carrier1, then the UE is not expected to transmit for the duration of $N_{TX1-TX2}$ on any of the three carriers. When the UE is to transmit a 1-port or 2-port transmission on UL carrier1, and if the preceding UL transmission was a 1-port or 2-port transmission on UL carrier2 or UL carrier3, then the UE is not expected to transmit for the duration of $N_{TX1-TX2}$ on any of the three carriers. When the UE is to transmit a 1-port or 2-port transmission on UL carrier2 or UL carrier3, and if the preceding UL transmissions were a 1-port transmission on UL carrier1 and a 1-port transmission on UL carrier2 or UL carrier3, then the UE is not expected to transmit for the duration of $N_{TX1-TX2}$ on any of the three carriers. When the UE is to transmit a 1-port transmission on UL carrier1 and a 1-port transmission on UL carrier2 or UL carrier3, and if the preceding UL transmission was a 1-port or 2-port transmission on UL carrier2 or UL carrier3, then the UE is not expected to transmit for the duration of $N_{TX1-TX2}$ on any of the three carriers. When the UE is to transmit a 1-port or 2-port transmission on UL carrier1, and if the preceding UL transmissions were a 1-port transmission on UL carrier1 and a 1-port transmission on UL carrier2 or UL carrier3, then the UE is not expected to transmit for the duration of $N_{TX1-TX2}$ on any of the three carriers. When the UE is to transmit a 1-port transmission on UL carrier1 and a 1-port transmission on UL carrier2 or UL carrier3, and if the preceding UL transmission was a 1-port or 2-port transmission on UL carrier1, then the UE is not expected to transmit for the duration of $N_{TX1-TX2}$ on any of the three carriers.

In other embodiments of the sixth embodiment, in a first operation state, the UE supports transmitting 1-port transmission on Band A and Band B. In a second operation state, the UE supports transmitting 1-port and 2-port transmission on Band B, and in a third operation state, the UE supports transmitting 1-port and 2-port transmission on Band A. When the UE is to transmit a 1-port or 2-port transmission on Band B, and if the preceding UL transmission was a 1-port or 2-port transmission on Band A, then the UE is not expected to transmit for the duration of $N_{TX1-TX2}$ on any of the three carriers. When the UE is to transmit a 1-port or 2-port transmission on Band A, and if the preceding UL transmission was a 1-port or 2-port transmission on Band B, then the UE is not expected to transmit for the duration of $N_{TX1-TX2}$ on any of the three carriers. When the UE is to transmit a 1-port or 2-port transmission on Band B, and if the preceding UL transmissions were a 1-port transmission on Band A and a 1-port transmission on Band B, then the UE is not expected to transmit for the duration of $N_{TX1-TX2}$ on any of the three carriers. When the UE is to transmit a 1-port transmission on Band A and a 1-port transmission on Band B, and if the preceding UL transmission was a 1-port or 2-port transmission on Band B, then the UE is not expected to transmit for the duration of $N_{TX1-TX2}$ on any of the three carriers. When the UE is to transmit a 1-port or 2-port transmission on Band A, and if the preceding UL transmissions were a 1-port transmission on Band A and a 1-port transmission on Band B, then the UE is not expected to transmit for the duration of $N_{TX1-TX2}$ on any of the three carriers. When the UE is to transmit a 1-port transmission on Band A and a 1-port transmission on Band B, and if the preceding UL transmission was a 1-port or 2-port transmission on Band A, then the UE is not expected to transmit for the duration of $N_{TX1-TX2}$ on any of the three carriers.

In a seventh embodiment of the second method (and nineteenth overall), three operation states are defined for the UE. In some embodiments of the seventh embodiment, in a first operation state, the UE supports transmitting 1-port transmission on UL carrier1, UL carrier2, and UL carrier3. In a second operation state, the UE supports 1-port and 2-port transmission on UL carrier2 and UL carrier3, and in a third operation state, the UE supports transmitting 1-port and 2-port transmission on UL carrier1. When the UE is to transmit a 1-port or 2-port transmission on UL carrier2 or UL carrier3, and if the preceding UL transmission was a 1-port or 2-port transmission on UL carrier1, then the UE is not expected to transmit for the duration of $N_{TX1-TX2}$ on any of the three carriers. When the UE is to transmit a 1-port or 2-port transmission on UL carrier1, and if the preceding uplink transmission was a 1-port or 2-port transmission on uplink carrier2 or carrier3, then the UE is not expected to transmit for the duration of $N_{TX1-TX2}$ on any of the three carriers. When the UE is to transmit a 2-port transmission on UL carrier2 or UL carrier3, if the preceding UL transmission was a 1-port transmission on UL carrier1, UL carrier2, or UL carrier3, and if the UE is under an operation state in which 2-port transmission cannot be supported in any UL carrier (i.e., the first operation state), then the UE is not expected to transmit for the duration of $N_{TX1-TX2}$ on any of the three carriers. When the UE is to transmit a 1-port transmission on UL carrier1 and a 1-port transmission on UL carrier2 or UL carrier3, if the preceding UL transmission was a 1-port or 2-port transmission on UL carrier2 or UL carrier3, and if the UE is under an operation state in which 2-port transmission can be supported in UL carrier2 and UL carrier3 (i.e., the second operation state), then the UE is not expected to transmit for the duration of $N_{TX1-TX2}$ on any of the three carriers. When the UE is to transmit a 2-port transmission on UL carrier1, if the preceding UL transmission was a 1-port transmission on UL carrier1, UL carrier2, or UL carrier3, and if the UE is under an operation state in which 2-port transmission cannot be supported in any carrier (i.e., the first operation state), then the UE is not expected to transmit for the duration of $N_{TX1-TX2}$ on any of the three carriers. When the UE is to transmit a 1-port transmission on UL carrier1 and a 1-port transmission on UL carrier2 or UL carrier3, and if the preceding UL transmission was a 1-port or 2-port transmission on UL carrier1, and if the UE is under an operation state in which 2-port transmission can be supported in UL carrier1 (i.e., the third operation state), then the UE is not expected to transmit for the duration of $N_{TX1\text{-}TX2}$ on any of the three carriers.

In an eighth embodiment of the second method (and twentieth overall), three operation states are defined for the UE. In some embodiments of the eighth embodiment, in a first operation state, the UE supports transmitting 1-port transmission on UL carrier1, UL carrier2, and UL carrier3. In a second operation state, the UE supports transmitting 1-port and 2-port transmission on UL carrier2 and UL carrier3, and in a third operation state, the UE supports transmitting 1-port and 2-port transmission on UL carrier1. When the UE is to transmit a 2-port transmission on UL carrier2 or UL carrier3, and if the preceding UL transmission was a 1-port or 2-port transmission on UL carrier1, then the UE is not expected to transmit for the duration of $N_{TX1\text{-}TX2}$ on any of the three carriers. When the UE is to transmit a 2-port transmission on UL carrier1, and if the preceding UL transmission was a 1-port or 2-port transmission on UL carrier2 or UL carrier3, then the UE is not expected to transmit for the duration of $N_{TX1\text{-}TX2}$ on any of the three carriers. When the UE is to transmit a 2-port transmission on UL carrier2 or UL carrier3, if the preceding UL transmission was a 1-port transmission on UL carrier1, UL carrier2, or UL carrier3, and if the UE is under an operation state in which 2-port transmission cannot be supported in any carrier (i.e., the first operation state), then the UE is not expected to transmit for the duration of $N_{TX1\text{-}TX2}$ on any of the three carriers. When the UE is to transmit a 1-port transmission on UL carrier1, if the preceding UL transmission was a 1-port or 2-port transmission on UL carrier2 or UL carrier3, and if the UE is under an operation state in which 2-port transmission can be supported in UL carrier2 and UL carrier3 (i.e., the second operation state), then the UE is not expected to transmit for the duration of $N_{TX1\text{-}TX2}$ on any of the three carriers. When the UE is to transmit a 2-port transmission on UL carrier1, if the preceding UL transmission was a 1-port transmission on UL carrier1, UL carrier2, or UL carrier3, and if the UE is under an operation state in which 2-port transmission cannot be supported in any carrier (i.e., the first operation state), then the UE is not expected to transmit for the duration of $N_{TX1\text{-}TX2}$ on any of the three carriers. When the UE is to transmit a 1-port transmission on UL carrier2 or UL carrier3, if the preceding UL transmission was a 1-port or 2-port transmission on UL carrier1, and if the UE is under an operation state in which 2-port transmission can be supported in UL carrier1 (i.e., the third operation state), then the UE is not expected to transmit for the duration of $N_{TX1\text{-}TX2}$ on any of the three carriers.

In a ninth embodiment of the second method (and twenty-first embodiment overall), three operation states are defined for the UE. In some embodiments of the ninth embodiment, in a first operation state, the UE supports transmitting 1-port transmission on UL carrier1, UL carrier2, and UL carrier3. In a second operation state, the UE supports transmitting 1-port and 2-port transmission on UL carrier2 and UL carrier3, and in a third operation state, the UE supports transmitting 2-port transmission on UL carrier1. When the UE is to transmit a 1-port or 2-port transmission on UL carrier2 or UL carrier3, and if the preceding UL transmission was a 1-port or 2-port transmission on UL carrier1, then the UE is not expected to transmit for the duration of $N_{TX1\text{-}TX2}$ on any of the three carriers. When the UE is to transmit a 1-port or 2-port transmission on UL carrier1, and if the preceding UL transmission was a 1-port or 2-port transmission on UL carrier2 or UL carrier3, then the UE is not expected to transmit for the duration of $N_{TX1\text{-}TX2}$ on any of the three carriers. When the UE is to transmit a 2-port transmission on UL carrier1, and if the preceding UL transmission was a 1-port transmission on UL carrier1, then the UE is not expected to transmit for the duration of $N_{TX1\text{-}TX2}$ on any of the three carriers. When the UE is to transmit a 1-port transmission on UL carrier1, and if the preceding UL transmission was a 2-port transmission on UL carrier1, then the UE is not expected to transmit for the duration of $N_{TX1\text{-}TX2}$ on any of the three carriers.

In other embodiments of this ninth embodiment, in a first operation state, the UE supports transmitting 1-port transmission on Band A and Band B. In a second operation state, the UE supports transmitting 1-port and 2-port transmission on Band B, and in a third operation state, the UE supports transmitting 2-port transmission on Band A. When the UE is to transmit a 1-port or 2-port transmission on Band B, and if the preceding UL transmission was a 1-port or 2-port transmission on Band A, then the UE is not expected to transmit for the duration of $N_{TX1\text{-}TX2}$ on any of the three carriers. When the UE is to transmit a 1-port or 2-port transmission on UL Band A, and if the preceding UL transmission was a 1-port or 2-port transmission on Band B, then the UE is not expected to transmit for the duration of $N_{TX1\text{-}TX2}$ on any of the three carriers. When the UE is to transmit a 2-port transmission on Band A, and if the preceding UL transmission was a 1-port transmission on Band A, then the UE is not expected to transmit for the duration of $N_{TX1\text{-}TX2}$ on any of the three carriers. When the UE is to transmit a 1-port transmission on Band A, and if the preceding UL transmission was a 2-port transmission on Band A, then the UE is not expected to transmit for the duration of $N_{TX1\text{-}TX2}$ on any of the three carriers.

In a tenth embodiment of the second method (and twenty-second overall), three operation states are defined for the UE. In some embodiments of the tenth embodiment, in a first operation state, the UE supports transmitting 1-port transmission on UL carrier1, UL carrier2, and UL carrier3. In a second operation state, the UE supports transmitting 1-port and 2-port transmission on UL carrier2 and UL carrier3, and in a third operation state, the UE supports transmitting 2-port transmission on UL carrier1. When the UE is to transmit a 1-port transmission on UL carrier 1, if the preceding UL transmission was a 1-port or 2-port transmission on UL carrier2 or UL carrier3, and if the UE is under an operation state in which 2-port transmission can be supported in UL carrier2 and UL carrier3 (i.e., the second operation state), the UE switches to an operation state in which 2-port transmission can be supported on UL carrier1 (i.e., the third operation state). When the UE is to transmit a 1-port transmission on UL carrier2 or UL carrier3, if the preceding UL transmission was a 1-port or 2-port transmission on UL carrier1, and if the UE is under an operation state in which 2-port transmission can be supported in UL carrier1 (i.e., the third operation state), the UE switches to an operation state in which 2-port transmission can be supported on UL carrier2 and UL carrier3 (i.e., the second operation state). For example, when the UE is to transmit a 1-port transmission on UL carrier 1 and is under the second operation state, the UE switches to the third operation state. In another example, when the UE is to transmit a 1-port transmission on UL carrier2 or UL carrier3 and is under the third operation state, the UE switches to the second operation state.

In an eleventh embodiment of the second method (and twenty-third embodiment overall), three operation states are defined for the UE. In some embodiments of the eleventh embodiment, in a first operation state, the UE supports transmitting 1-port transmission on UL carrier1, UL carrier2, and UL carrier3. In a second operation state, the UE supports transmitting 1-port and 2-port transmission on UL carrier2 and UL carrier3, and in a third operation state, the UE supports transmitting 2-port transmission on UL carrier1. When the UE is to transmit a 1-port transmission on UL carrier 1, if the preceding UL transmission was a 1-port or 2-port transmission on UL carrier2 or UL carrier3, and if the UE is under an operation state in which 2-port transmission can be supported in UL carrier2 and UL carrier3 (i.e., the second operation state), the UE switches to an operation state in which 2-port transmission cannot be supported on any carrier (i.e., the first operation state). When the UE is to transmit a 1-port transmission on UL carrier2 or UL carrier3, if the preceding UL transmission was a 1-port or 2-port transmission on UL carrier1, and if the UE is under an operation state in which 2-port transmission can be supported in UL carrier1 (i.e., the third operation state), the UE switches to an operation state in which 2-port transmission cannot be supported in any carrier (i.e., the first operation state). For example, when the UE is to transmit a 1-port transmission on UL carrier1 and is under the second operation state, the UE switches to the first operation state. In another example, when the UE is to transmit a 1-port transmission on UL carrier2 or UL carrier3 and is under the third operation state, the UE switches to the first operation state.

In a twelfth embodiment of the second method (and twenty-fourth embodiment overall), three operation states are defined for the UE. In some embodiments of the twelfth embodiment, in a first operation state, the UE supports transmitting 1-port on UL carrier1, UL carrier2, and UL carrier3. In a second operation state, the UE supports transmitting 1-port and 2-port transmission on UL carrier2 and UL carrier3, and in a third operation state, the UE supports transmitting 2-port transmission on UL carrier1. When the UE is to transmit a 1-port transmission on UL carrier 2 or UL carrier3, if the preceding UL transmission was a 1-port or 2-port transmission on UL carrier1, and if the UE is under an operation state in which 2-port transmission can be supported in UL carrier1 (i.e., the third operation state), the UE switches to an operation state in which 2-port transmission cannot be supported in any carrier (i.e., the first operation state). When the UE is to transmit a 1-port transmission on UL carrier1, if the preceding UL transmission was a 1-port or 2-port transmission on UL carrier2 or UL carrier3, and if the UE is under an operation state in which 2-port transmission can be supported in UL carrier2 and UL carrier3 (i.e., the second operation state), the UE switches to an operation state in which 2-port transmission can be supported on UL carrier1 (i.e., the third operation state). For example, when the UE is to transmit a 1-port transmission on UL carrier2 or UL carrier3 and is under the third operation state, the UE switches to the first operation state. In another example, when the UE is to transmit a 1-port transmission on UL carrier1 and is under the second operation state, the UE switches to the third operation state.

In a thirteenth embodiment of the second method (and twenty-fifth embodiment overall), three operation states are defined for the UE. In a first operation state, the UE supports transmitting 1-port transmission on UL carrier1, UL carrier2, and UL carrier3. In a second operation state, the UE supports transmitting 1-port and 2-port transmission on UL carrier 2 and UL carrier3, and in a third operation state, the UE supports transmitting 2-port transmission on UL carrier1. When the UE is to transmit a 1-port transmission on UL carrier1, if the preceding UL transmission was a 1-port or 2-port transmission on UL carrier2 or UL carrier3, and if the UE is under an operation state in which 2-port transmission can be supported in UL carrier2 and UL carrier3 (i.e., the second operation state), the UE switches to an operation state in which 2-port transmission cannot be supported on any carrier (i.e., the first operation state). When the UE is to transmit a 1-port transmission on UL carrier2 or UL carrier3, if the preceding UL transmission was a 1-port or 2-port transmission on UL carrier1, and if the UE is under an operation state in which 2-port transmission can be supported on UL carrier1 (i.e., the third operation state), the UE switches to an operation state in which 2-port transmission can be supported on UL carrier2 and UL carrier3 (i.e., the second operation state). For example, when the UE is to transmit a 1-port transmission on UL carrier1 and is under the second operation state, the UE switches to the first operation state. In another example, when the UE is to transmit a 1-port transmission on UL carrier2 or UL carrier3 and is under the third operation state, the UE switches to the second operation state.

In a fourteenth embodiment of the second method (and twenty-sixth embodiment overall), three operation states are defined for the UE. These three operation states are similar to those defined in the tenth, eleventh, twelfth, and thirteenth embodiments for the second method described herein, and there are different rules for the UE to switch among these three modes. These different rules are similar to those defined for the tenth, eleventh, twelfth, and thirteenth embodiments for the second method described herein. In some embodiments of this fourteenth embodiment, the network configures one of these rules for the UE via RRC signaling. In other embodiments, the network indicates one of these rules for the UE via DCI or MAC-CE.

In a fifteenth embodiment of the second method (and twenty-seventh embodiment overall), three operation states are defined for the UE. In some embodiments of the fifteenth embodiment, in a first operation state, the UE supports transmitting 1-port transmission on UL carrier1, UL carrier2, and UL carrier3. In a second operation state, the UE supports transmitting 1-port and 2-port transmission on UL carrier2 and UL carrier3, and in a third operation state, the UE supports transmitting 2-port transmission on UL carrier1. When the UE is to transmit a 1-port transmission on UL carrier1, if the preceding transmission was a 1-port or 2-port transmission on UL carrier2 or UL carrier3, and if the UE is under an operation state in which 2-port transmission can be supported on UL carrier2 and UL carrier3 (i.e., the second operation state): 1) the UE switches to an operation state in which 2-port transmission cannot be supported on any UL carrier (i.e., the first operation state) if the UL phase of UL carrier1, in which the 1-port transmission is to be transmitted, overlaps in time with a UL symbol of UL carrier2 or UL carrier3; or 2) the UE switches to an operation state in which 2-port transmission can be supported on UL carrier1 (i.e., the third operation state) if the UL phase of UL carrier1, in which the 1-port transmission is to be transmitted, does not overlap in time with any UL symbol of UL carrier2 or UL carrier3. When the UE is to transmit a 1-port transmission on UL carrier2 or UL carrier3, if the preceding transmission was a 1-port or 2-port transmission on UL carrier1, and if the UE is under an operation state in which 2-port transmission can be supported on UL carrier1 (i.e., the third operation state): 1) the UE switches to an operation state in which 2-port transmission cannot be supported on any UL carrier (i.e., the first operation state) if the UL phase of UL carrier2 or UL carrier3, in which the 1-port transmission is to be transmitted, overlaps in time with a UL symbol of UL carrier1; or 2) the UE switches to an operation state in which 2-port transmission can be supported on UL carrier2 and UL carrier3 (i.e., the second operation state) if the UL phase of UL carrier2 or UL carrier3, in which the 1-port transmission is to be transmitted, does not overlap in time with any UL symbol of UL carrier1. For example, when the UE is to transmit a 1-port transmission on UL carrier1 and is under the second operation state, the UE switches to the first operation state if the UL phase of UL carrier1 overlaps in time with the UL symbol of UL carrier2 or UL carrier3, or to the third operation state if the UL phase of UL carrier1 does not overlap in time with any UL symbol of UL carrier2 or UL carrier3. In another example, when the UE is to transmit a 1-port transmission on UL carrier2 or UL carrier3 and is under the third operation state, the UE switches to the first operation state if the UL phase of UL carrier2 or UL carrier3 in which the 1-port transmission is to be transmitted overlaps in time with a UL symbol of UL carrier1, or to the second operation state if the UL phase of carrier2 or carrier3 in which the 1-port transmission is to be transmitted does not overlap in time with any UL symbol of UL carrier2 or UL carrier3. As used herein, UL phase is a duration of time and can be one of a slot, a subframe, all UL symbols in one slot of a configuration period, or all UL symbols and flexible symbols in one slot of the configuration period.

FIG. 1A is a flowchart diagram illustrating an example wireless communication method 100a, according to various arrangements. As shown in FIG. 1A, the method 100a can be performed by a UE. The method 100a begins at block 110, where the UE determines a first carrier (i.e., UL carrier1) corresponding to a first frequency resource (i.e., Band X) and a second carrier (i.e., UL carrier2) corresponding to a second frequency resource (i.e. Band Y). At block 120, the UE determines whether to transmit a third transmission during a time interval (i.e., $N_{TX1-TX2}$) based on a first transmission, a second transmission, and an operation state. The second transmission is transmitted before the first transmission, and the third transmission is at least one of Physical Random Access Channel (PRACH), Physical Uplink Shared Channel (PUSCH), Physical Uplink Control Channel (PUCCH), or Sounding Reference Signal (SRS). In some embodiments, the third transmission is the first transmission, such that the determination is whether or not to transmit the first transmission during the time interval $N_{TX1-TX2}$.

Figure 2:
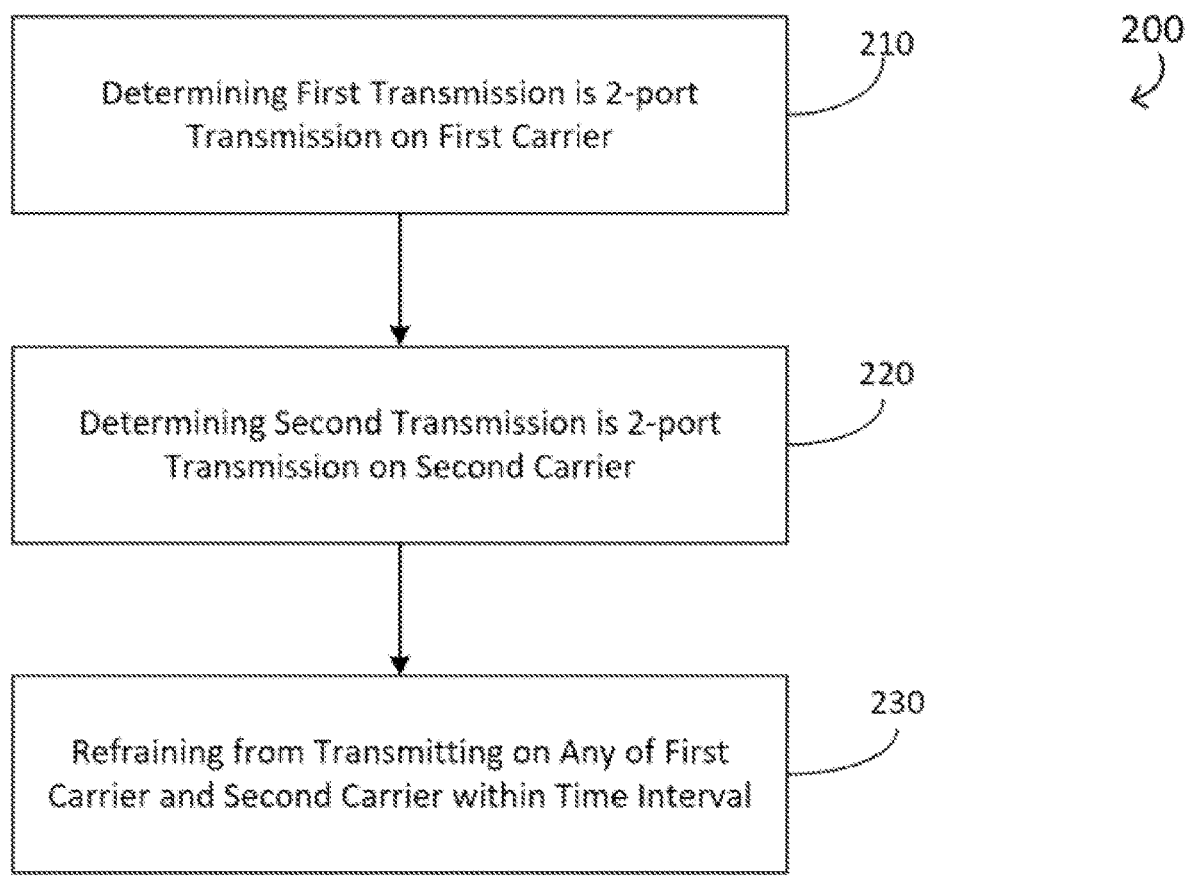
FIG. 2 is a flowchart diagram illustrating an example embodiment of the wireless communication method of FIG. 1A, according to various arrangements.

FIG. 2 is a flowchart illustrating a method 200 for wireless communication, according to various arrangements. As shown in FIG. 2, the method 200 is an embodiment of the method 100a and is performed by a UE. The method 200 begins at block 210, where the UE determines that the first transmission is a 2-port transmission on the first carrier. At block 220, the UE determines that the second transmission is a 2-port transmission on the second carrier, and, at block 230, refrains from transmitting on any of the first carrier and the second carrier within the time interval. As used herein, refraining from transmitting refers to the UE being not expected to transmit a transmission for the time interval given by $N_{TX1-TX2}$. This transmission may be the third transmission, such that the UE is not expected to transmit the third transmission for the duration of $N_{TX1-TX2}$. Alternatively, the third transmission can be the first transmission, such that the UE is not expected to transmit the first transmission for the duration of $N_{TX1-TX2}$.

Figure 3:
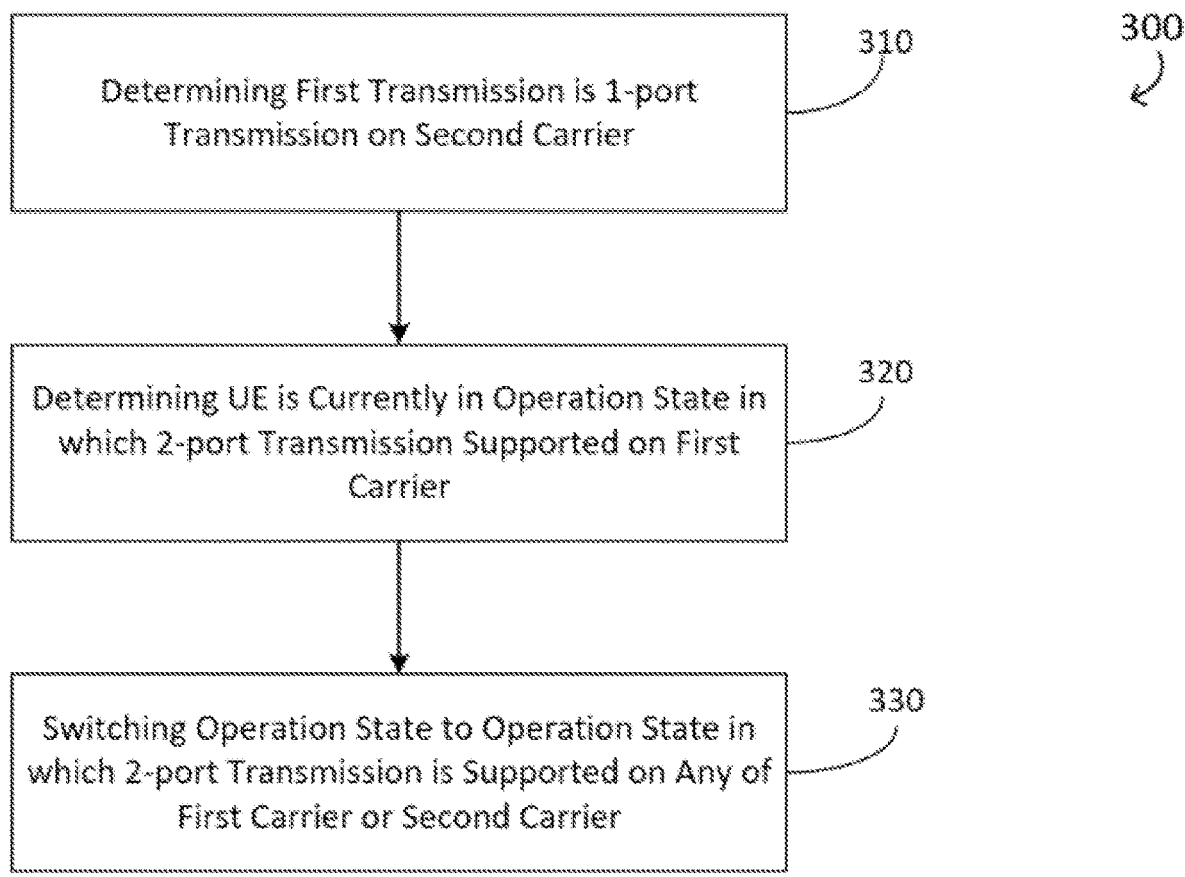
FIG. 3 is a flowchart diagram illustrating an example embodiment of the wireless communication method of FIG. 1A, according to various arrangements.

FIG. 3 is a flowchart illustrating a method 300 for wireless communication, according to various arrangements. As shown in FIG. 3, the method 300 is an embodiment of the method 100a and is performed by a UE. The method 300 begins at block 310, where the UE determines that the first transmission is a 1-port transmission on the second carrier. At block 320, the UE determines that the UE is currently in an operation state in which 2-port transmission is supported on the first carrier, and, at block 330, the UE switches the operation state to an operation state in which 2-port transmission is supported on any of the first carrier or the second carrier.

Figure 4:
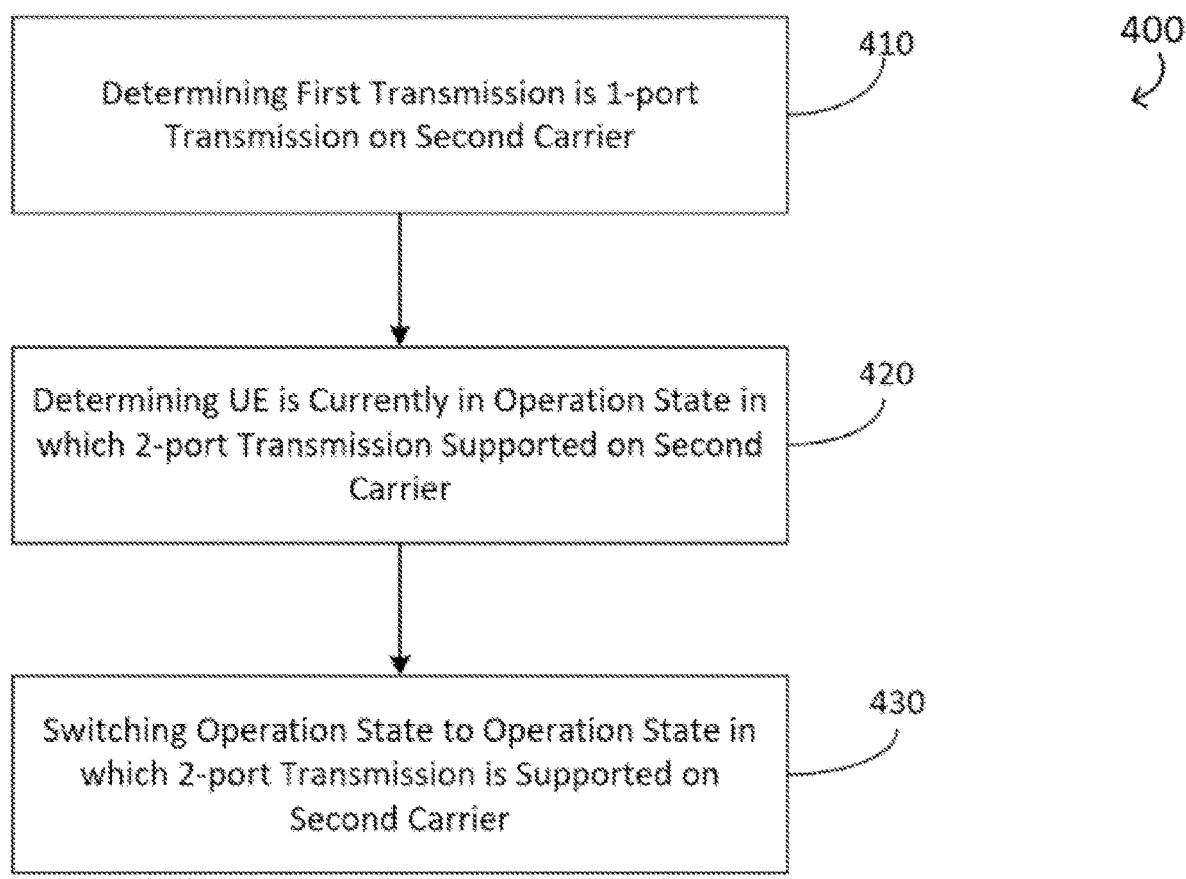
FIG. 4 is a flowchart diagram illustrating an example embodiment of the wireless communication method of FIG. 1A, according to various arrangements.

FIG. 4 is a flowchart illustrating a method 200 for wireless communication, according to various arrangements. As shown in FIG. 4, the method 400 is an embodiment of the method 100a and is performed by a UE. The method 400 begins at block 410, where the UE determines that the first transmission is a 1-port transmission on the second carrier. At block 420, the UE determines that the UE is currently in an operation state in which 2-port transmission is supported on the first carrier, and, at block 430, switches the operation state to an operation state in which 2-port transmission is supported on the second carrier.

Figure 5:
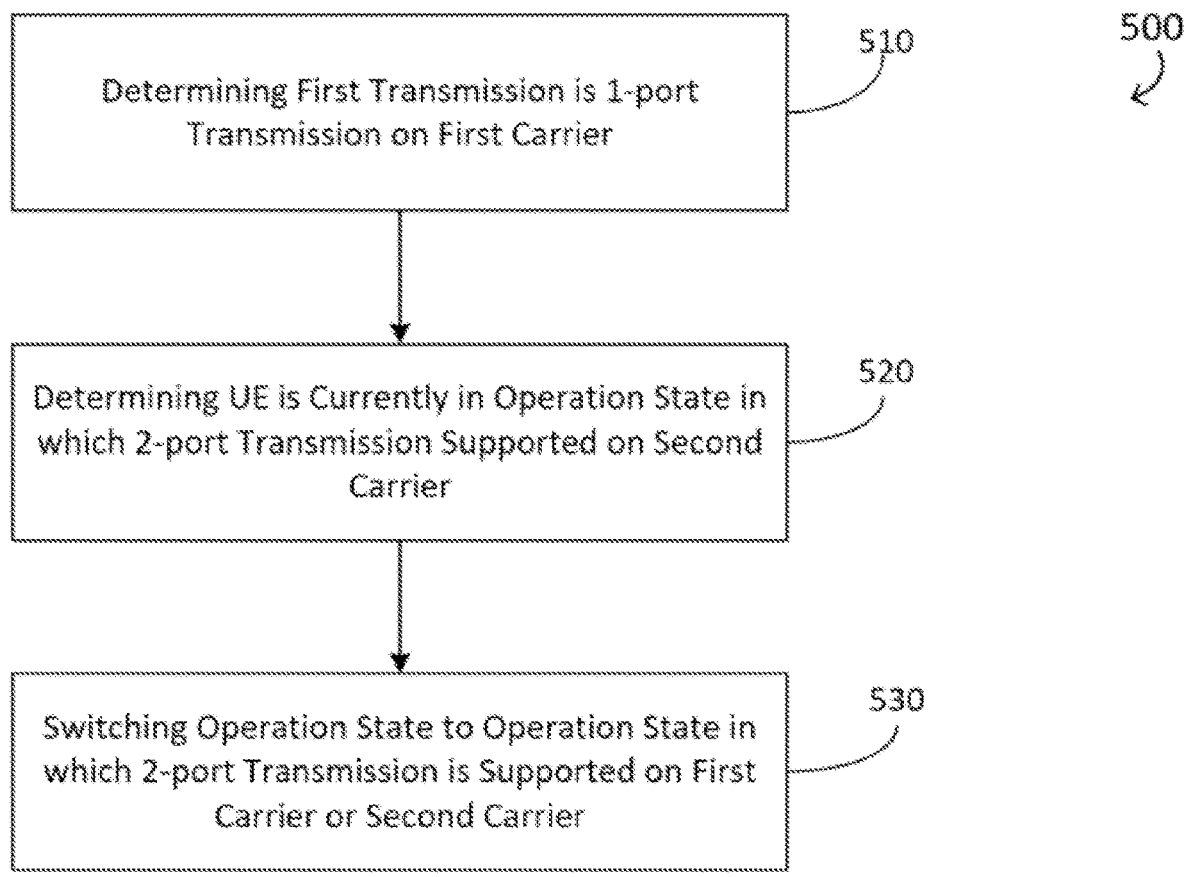
FIG. 5 is a flowchart diagram illustrating an example embodiment of the wireless communication method of FIG. 1A, according to various arrangements.

FIG. 5 is a flowchart illustrating a method 500 for wireless communication, according to various arrangements. As shown in FIG. 5, the method 500 is an embodiment of the method 100a and is performed by a UE. The method 500 begins at block 510, where the UE determines that the first transmission is a 1-port transmission on the first carrier. At block 520, the UE determines that the UE is currently in an operation state in which 2-port transmission is supported on the second carrier, and, at block 530, switches the operation state to an operation state in which 2-port transmission is supported on the first carrier or the second carrier.

Figure 6:
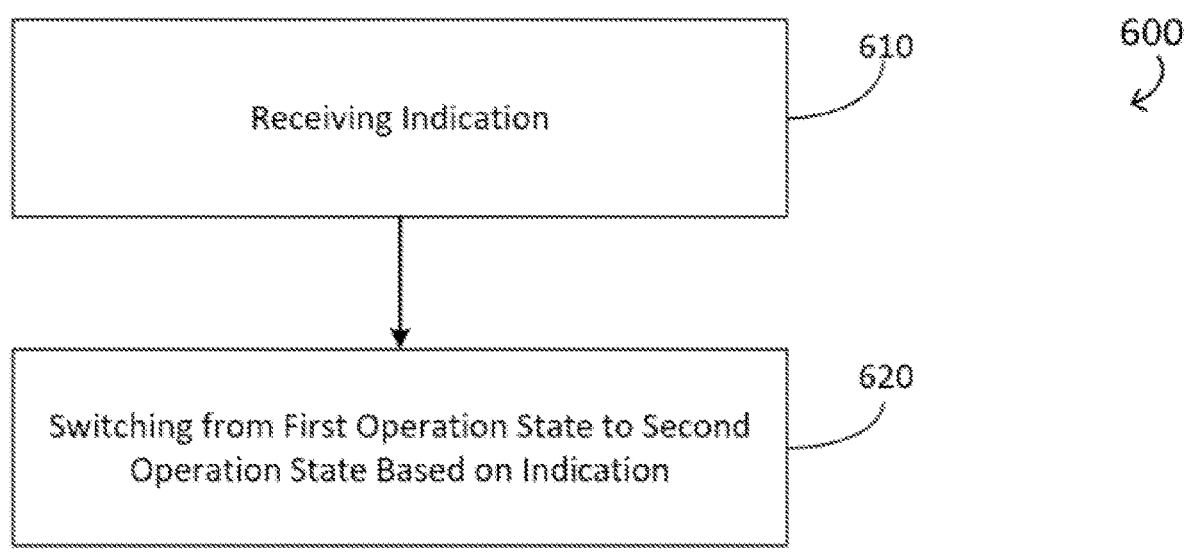
FIG. 6 is a flowchart diagram illustrating an example embodiment of the wireless communication method of FIG. 1A, according to various arrangements.

FIG. 6 is a flowchart illustrating a method 600 for wireless communication, according to various arrangements. As shown in FIG. 6, the method 600 is an embodiment of the method 100a and is performed by a UE. The method 600 begins at block 610, where the UE receives an indication and, at block 620, switches from a first operation state to a second operation state based on the indication.

Figure 7:
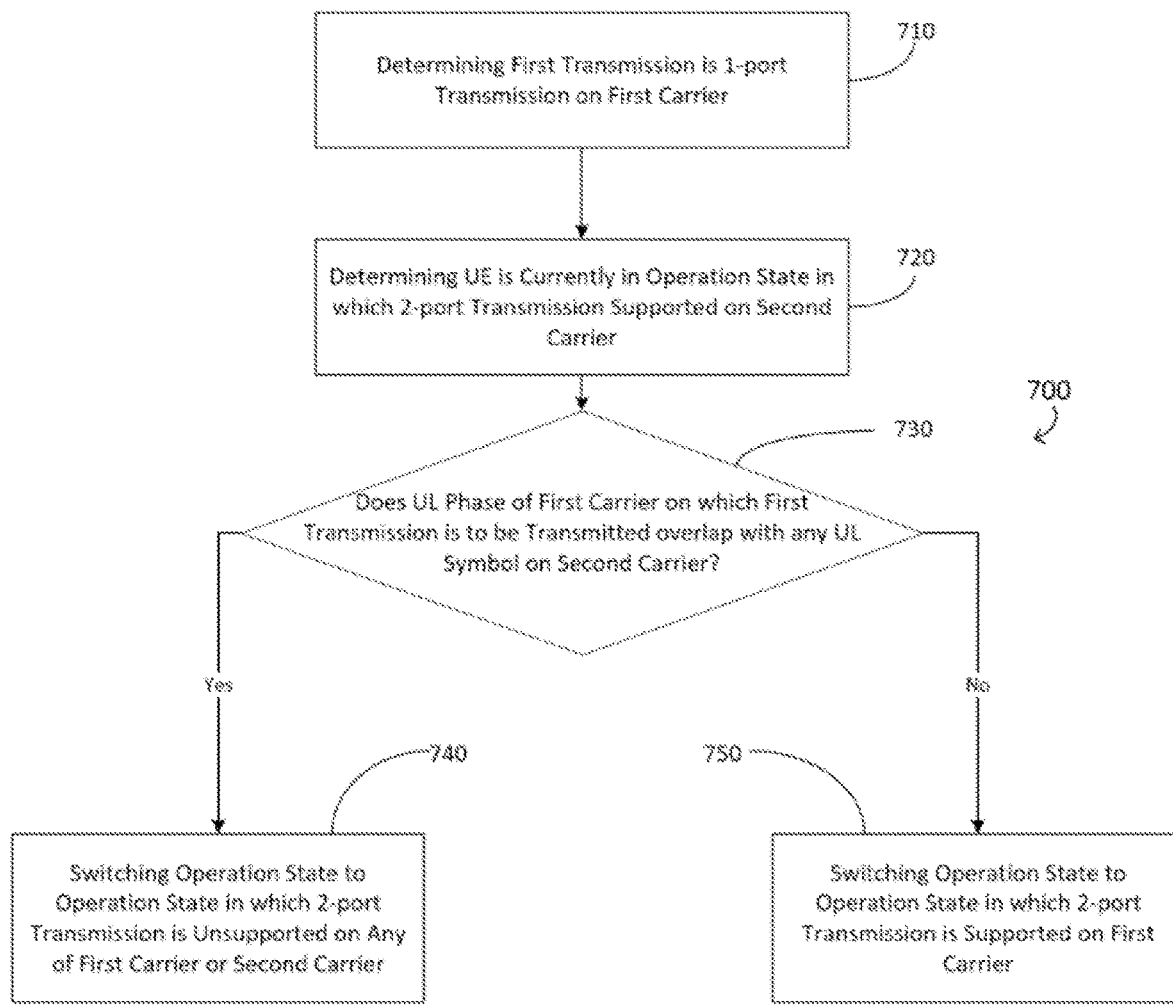
FIG. 7 is a flowchart diagram illustrating an example embodiment of the wireless communication method of FIG. 1A, according to various arrangements.

FIG. 7 is a flowchart illustrating a method 700 for wireless communication, according to various arrangements. As shown in FIG. 7, the method 700 is an embodiment of the method 100a and is performed by a UE. The method 700 begins at block 710, where the UE determines that the first transmission is a 1-port transmission on the first carrier. At block 720, the UE determines that the UE is currently in an operation state in which 2-port transmission is supported on the second carrier. At block 730, the UE determines if a UL phase of the first carrier on which the first transmission is to be transmitted overlaps in time with a UL symbol on the second carrier. In response to determining there is overlap (730: YES), the UE switches the operation state to an operation state in which 2-port transmission is unsupported on any of the first carrier or second carrier at block 740. In response to determining there is no overlap (730: NO), the UE switches the operation state to an operation state in which 2-port transmission is supported on the first carrier at block 750.

Figure 8:
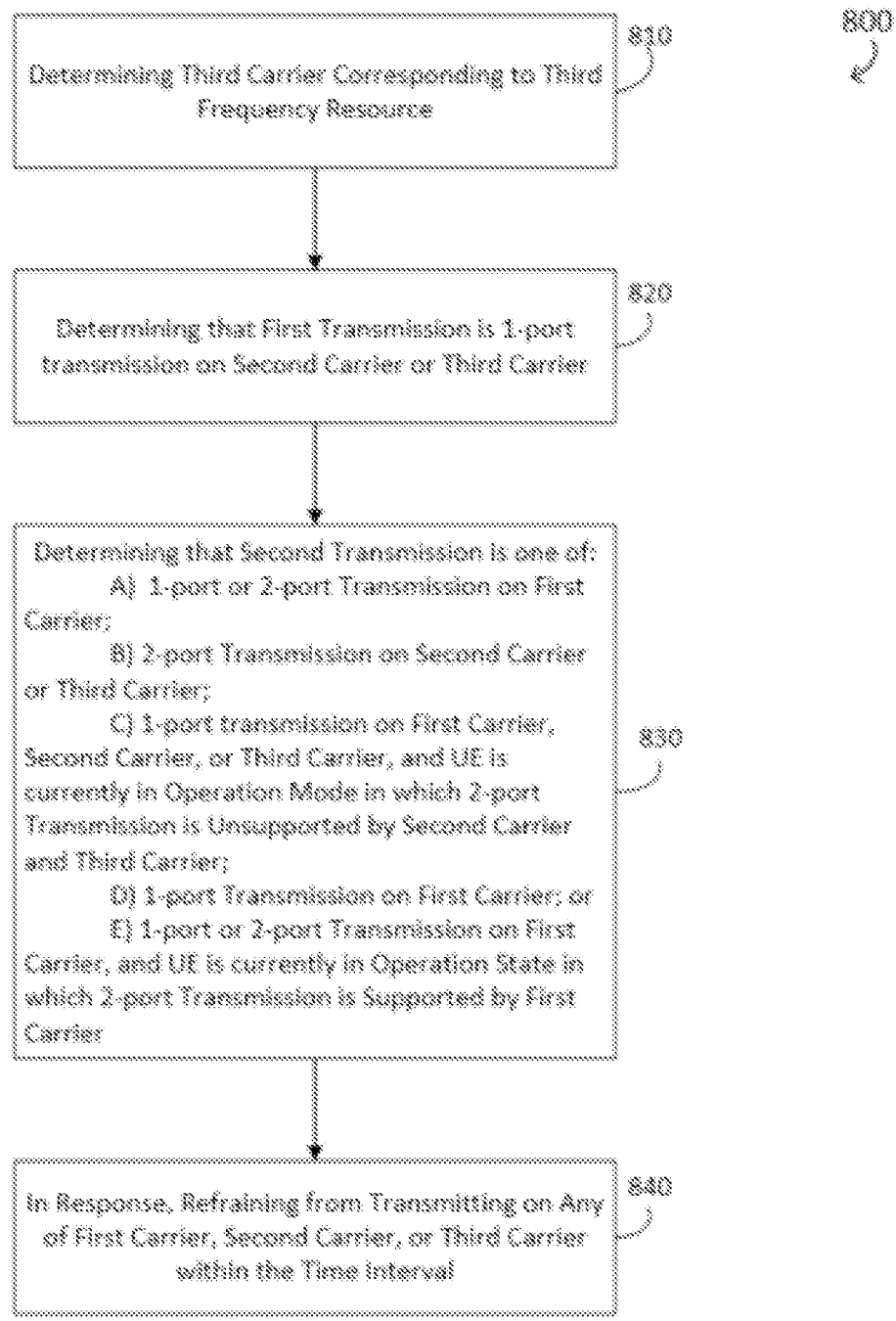
FIG. 8 is a flowchart diagram illustrating an example embodiment of the wireless communication method of FIG. 1A, according to various arrangements.

FIG. 8 is a flowchart illustrating a method 800 for wireless communication, according to various arrangements. As shown in FIG. 8, the method 800 is an embodiment of the method 100a and is performed by a UE. The method 800 begins at block 810, where the UE determines a third carrier (i.e., UL carrier3) corresponding to a third frequency resource (i.e., Band Y). At block 820, the UE determines that the first transmission is a 1-port transmission on the second carrier or the third carrier. At block 830, the UE determines that the second transmission is one of 1) a 1-port or 2-port transmission on the first carrier; 2) a 2-port transmission on the second carrier or the third carrier; 3) a 1-port transmission on the first carrier, the second carrier, or the third carrier, and the UE is currently in an operation state in which 2-port transmission is unsupported by the second carrier and third carrier; 4) a 1-port transmission on the first carrier and a 1-port transmission on the second carrier or the third carrier; or 5) a 1-port or 2-port transmission on the first carrier, and the UE is currently in an operation state in which 2-port transmission is supported by the first carrier. In response to these determinations, the UE refrains from transmitting on any of the first carrier, the second carrier, or the third carrier within the time interval at block 840.

Figure 9:
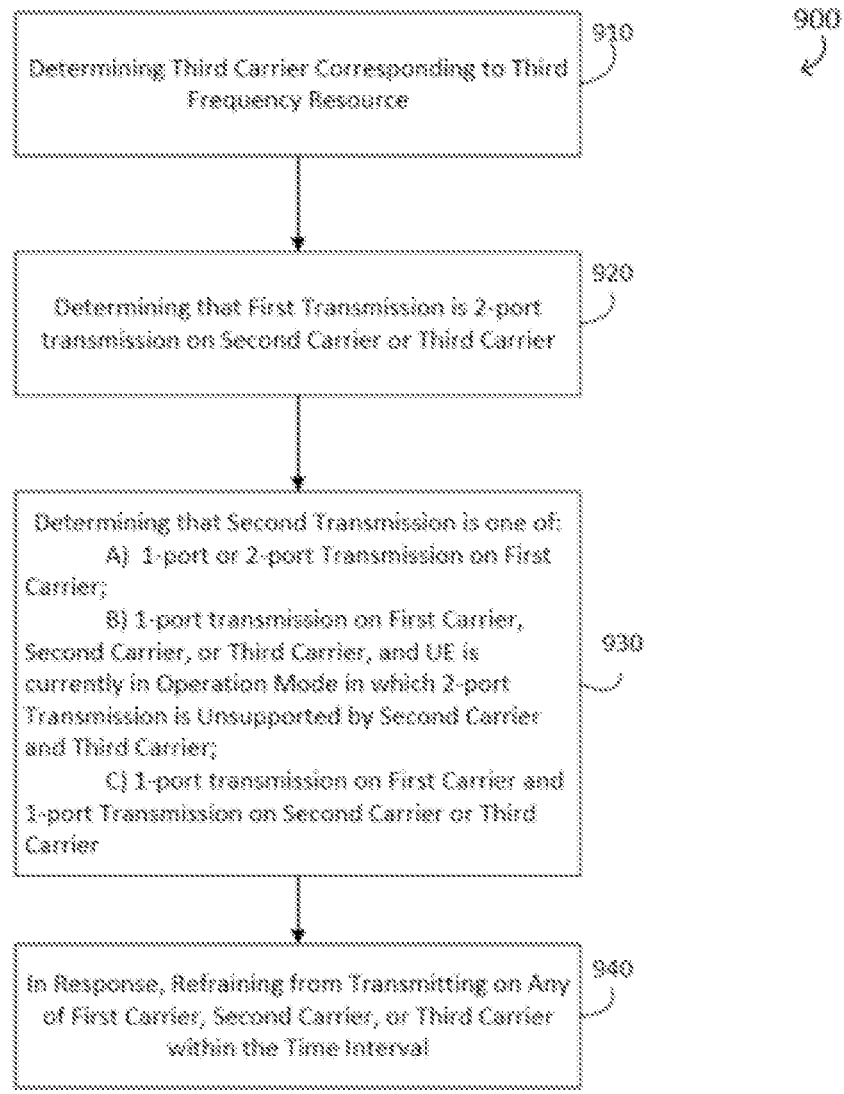
FIG. 9 is a flowchart diagram illustrating an example embodiment of the wireless communication method of FIG. 1A, according to various arrangements.

FIG. 9 is a flowchart illustrating a method 900 for wireless communication, according to various arrangements. As shown in FIG. 9, the method 900 is an embodiment of the method 100*a* and is performed by a UE. The method 900 begins at block 910, where the UE determines the third carrier corresponding to the third frequency resource. At block 920, the UE determines that the first transmission is a 2-port transmission on the second carrier or third carrier. At block 930, the UE determines that the second transmission is one of: 1) a 1-port transmission or 2-port transmission on the first carrier; 2) a 1-port transmission on the first carrier, the second carrier, or the third carrier, and the UE is currently in an operation state in which 2-port transmission is unsupported by any of the second carrier or third carrier; or 3) a 1-port transmission on the first carrier and a 1-port transmission on the second carrier or third carrier. In response to these determinations, the UE refrains from transmitting on any of the first carrier, the second carrier, or the third carrier within the time interval at block 940.

Figure 10:
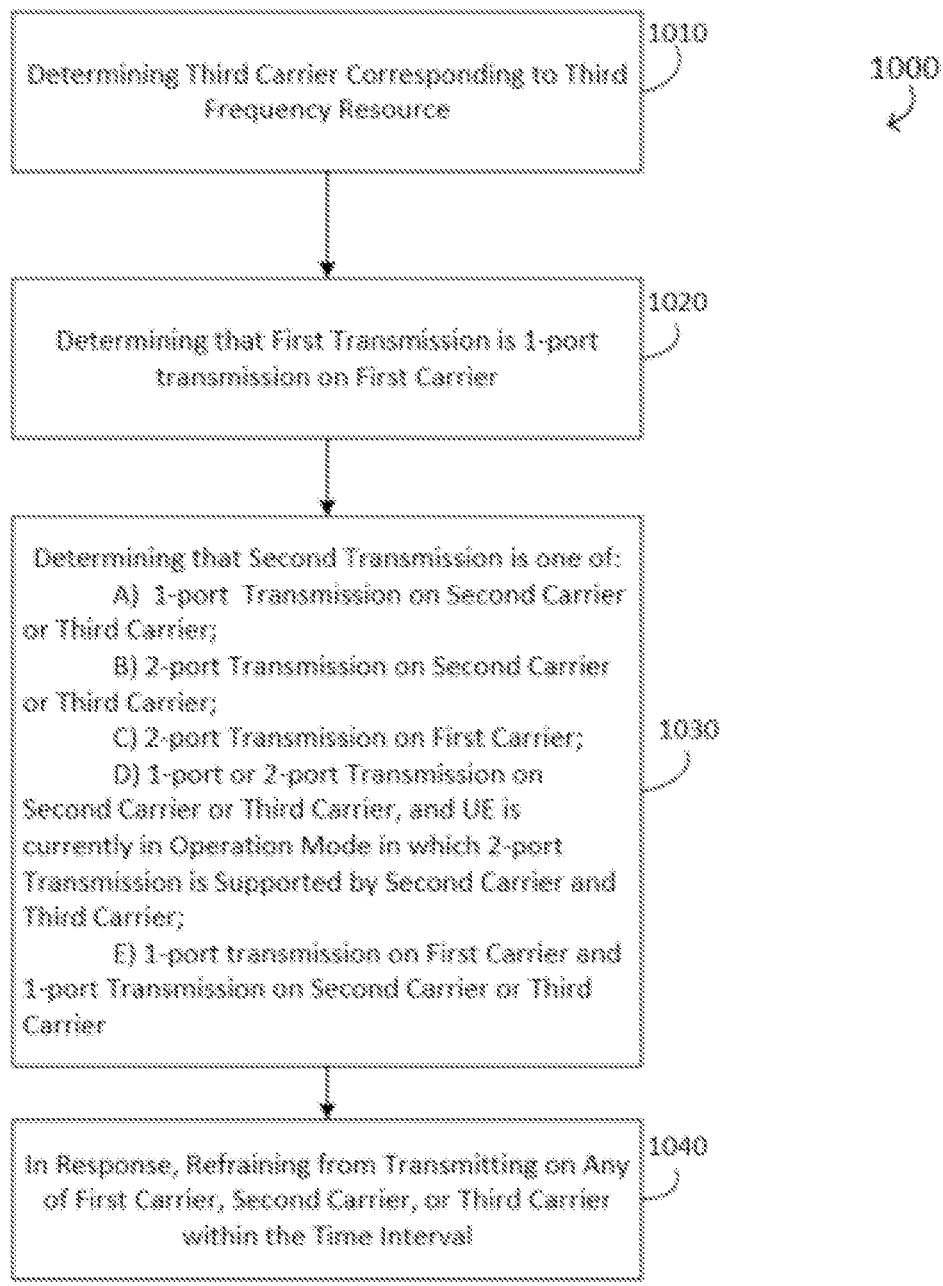
FIG. 10 is a flowchart diagram illustrating an example embodiment of the wireless communication method of FIG. 1A, according to various arrangements.

FIG. 10 is a flowchart illustrating a method 1000 for wireless communication, according to various arrangements. As shown in FIG. 10, the method 1000 is an embodiment of the method 100*a* and is performed by a UE. The method 1000 begins at block 1010, where the UE determines the third carrier corresponding to the third frequency resource. At block 1020, the UE determines that the first transmission includes a 1-port transmission on the first carrier. At block 1030, the UE determines that the second transmission includes one of: 1) a 1-port transmission on the second carrier or the third carrier; 2) a 2-port transmission on the second carrier or third carrier; 3) a 2-port transmission on the first carrier; 4) a 1-port or 2-port transmission on the second carrier or third carrier, and the UE is currently in an operation state in which 2-port transmission is supported by the second carrier and third carrier; or 5) a 1-port transmission on the first carrier, and a 1-port transmission on the second carrier or third carrier. In response to these determinations, the UE refrains from transmitting on any of the first carrier, the second carrier, or the third carrier within the time interval at block 1040.

Figure 11:
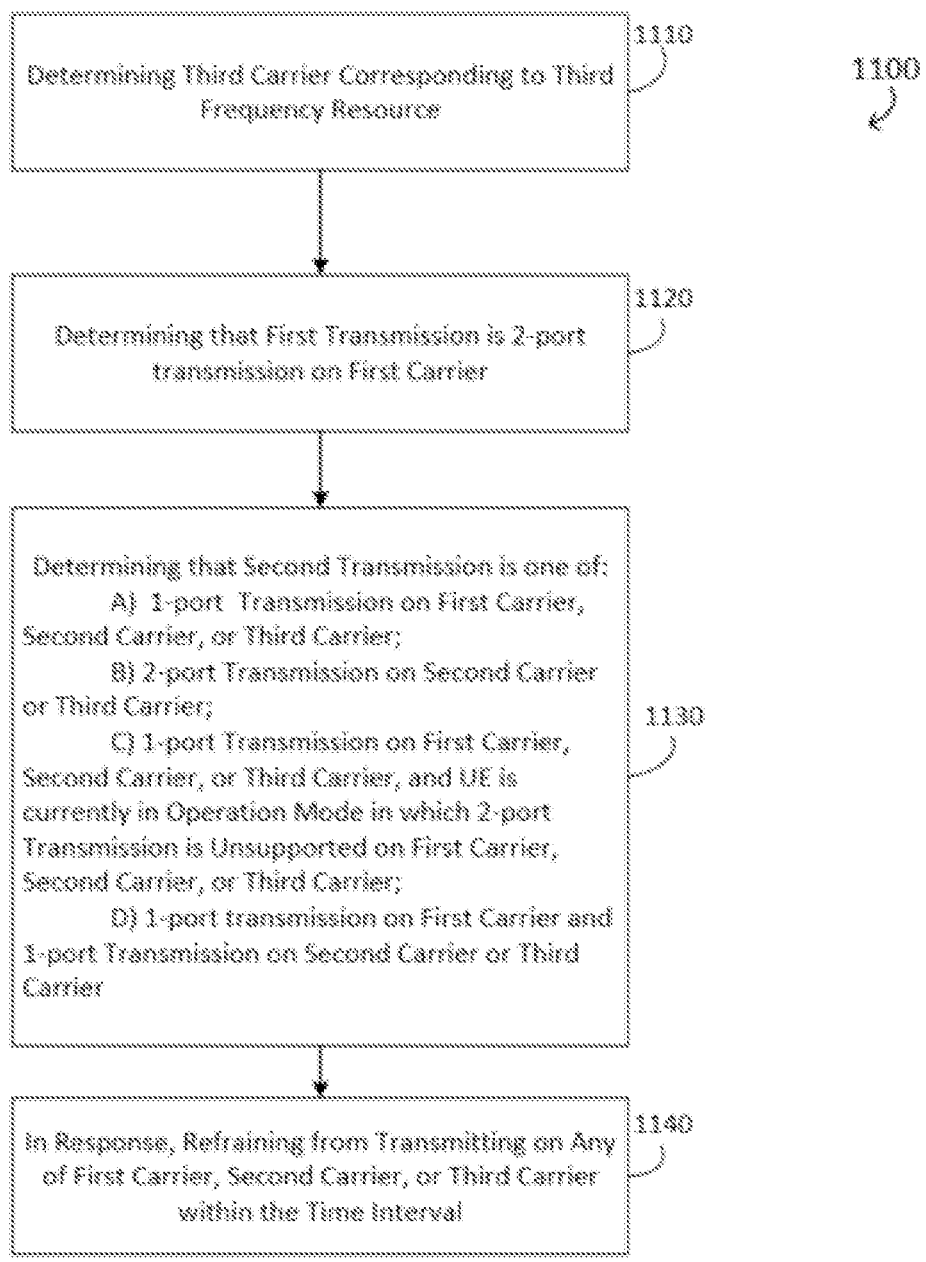
FIG. 11 is a flowchart diagram illustrating an example embodiment of the wireless communication method of FIG. 1A, according to various arrangements.

FIG. 11 is a flowchart illustrating a method 1100 for wireless communication, according to various arrangements. As shown in FIG. 11, the method 1100 is an embodiment of the method 100*a* and is performed by a UE. The method 1100 begins at block 1110, where the UE determines the third carrier corresponding to the third frequency resource. At block 1120, the UE determines that the first transmission is a 2-port transmission on the first carrier. At block 1130, the UE determines that the second transmission is one of: 1) a 1-port transmission on the first carrier, the second carrier, or the third carrier; 2) a 2-port transmission on the second carrier or third carrier; 3) a 1-port transmission on the first carrier, the second carrier, or the third carrier, and the UE is currently in an operation state in which 2-port transmission is unsupported on any of the first carrier, the second carrier, or the third carrier; or 4) a 1-port transmission on the first carrier, and a 1-port transmission on the second carrier or third carrier. In response to these determinations, the UE refrains from transmitting on any of the first carrier, the second carrier, or the third carrier within the time interval at block 1140.

Figure 12:
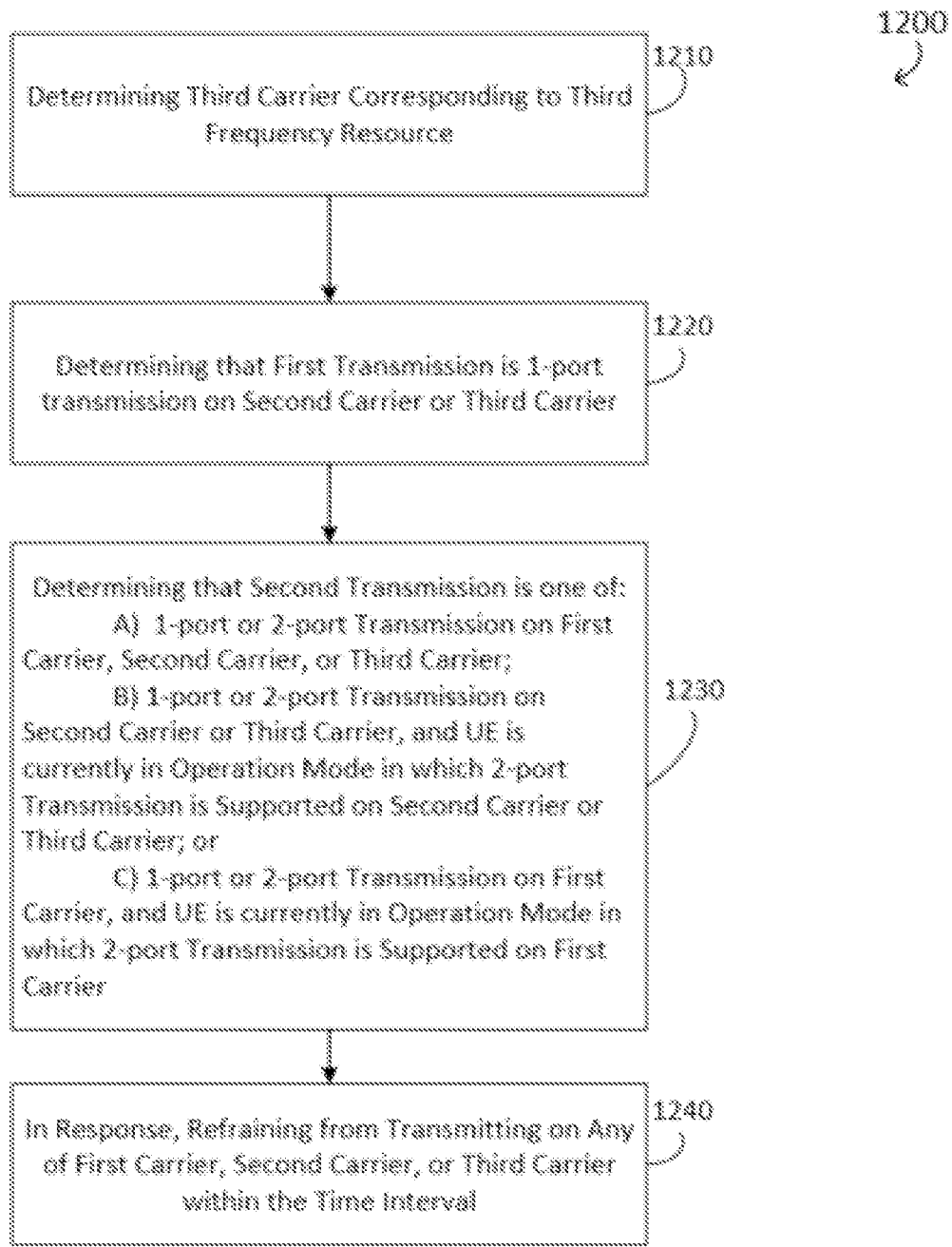
FIG. 12 is a flowchart diagram illustrating an example embodiment of the wireless communication method of FIG. 1A, according to various arrangements.

FIG. 12 is a flowchart illustrating a method 1200 for wireless communication, according to various arrangements. As shown in FIG. 12, the method 1200 is an embodiment of the method 100*a* and is performed by a UE. The method 1200 begins at block 1210, where the UE determines the third carrier corresponding to the third frequency resource. At block 1220, the UE determines that the first transmission is a 1-port transmission on the first carrier and a 1-port transmission on the second carrier or the third carrier. At block 1230, the UE determines that the second transmission is one of: 1) a 1-port transmission or 2-port transmission on the first carrier, the second carrier, or the third carrier; 2) a 1-port or 2-port transmission on the second carrier or the third carrier, and the UE is currently in an operation state in which 2-port transmission is supported by the second carrier and the third carrier; or 3) a 1-port or 2-port transmission on the first carrier, and the UE is currently in an operation state in which 2-port transmission is supported by the first carrier. In response to these determinations, the UE refrains from transmitting on any of the first carrier, the second carrier, or the third carrier within the time interval at block 1240.

Figure 13:
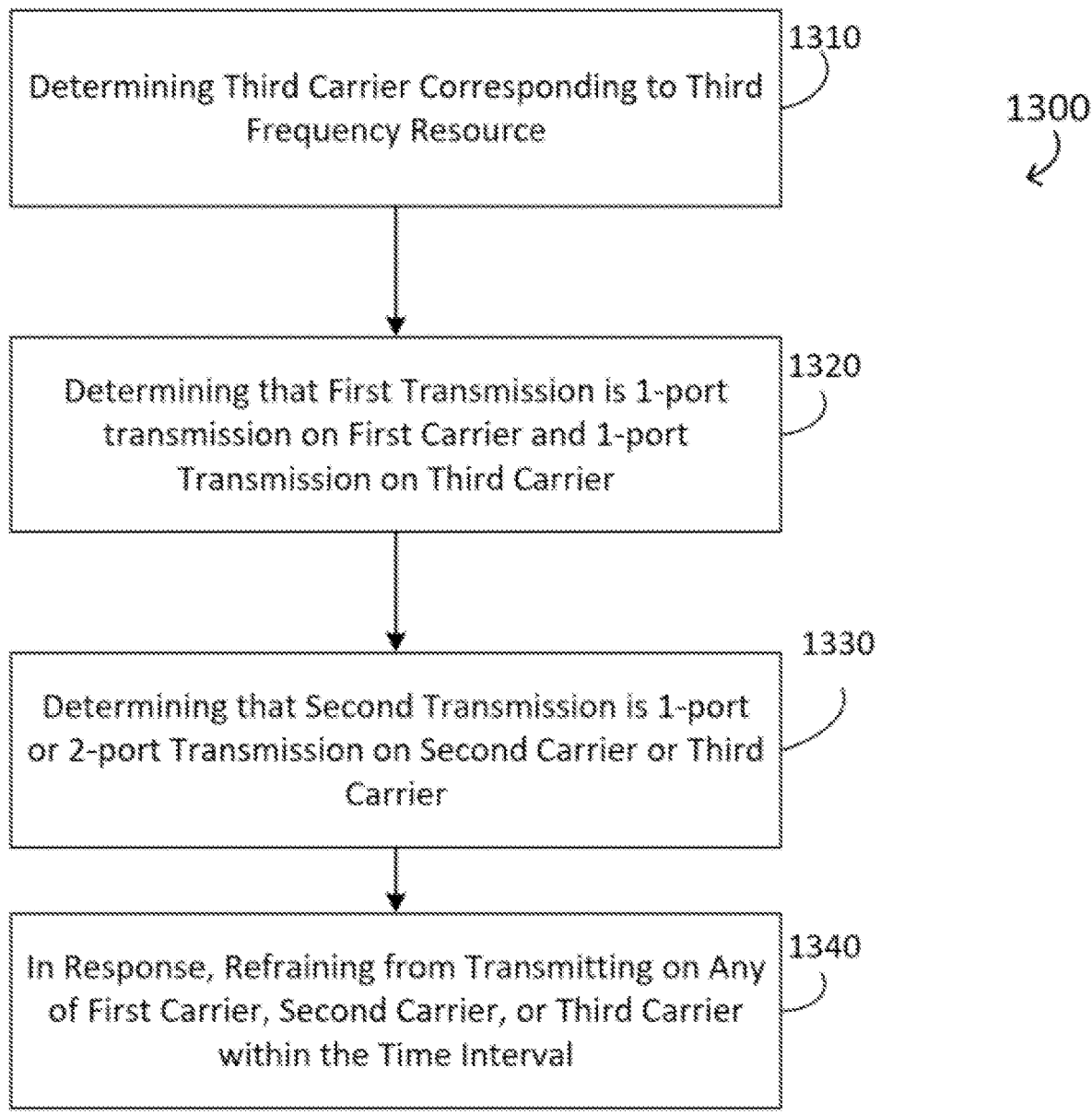
FIG. 13 is a flowchart diagram illustrating an example embodiment of the wireless communication method of FIG. 1A, according to various arrangements.

FIG. 13 is a flowchart illustrating a method 1300 for wireless communication, according to various arrangements. As shown in FIG. 13, the method 1300 is an embodiment of the method 100*a* and is performed by a UE. The method 1300 begins at block 1310, where the UE determines the third carrier corresponding to the third frequency resource. At block 1320, the UE determines that the first transmission is a 1-port transmission on the first carrier and a 1-port transmission on the third carrier, and determines, at block 1330, that the second transmission is a 1-port or 2-port transmission on the second carrier or the third carrier. In response to these determinations, the UE refrains from transmitting on any of the first carrier, the second carrier, or the third carrier within the time interval at block 1340.

Figure 14:
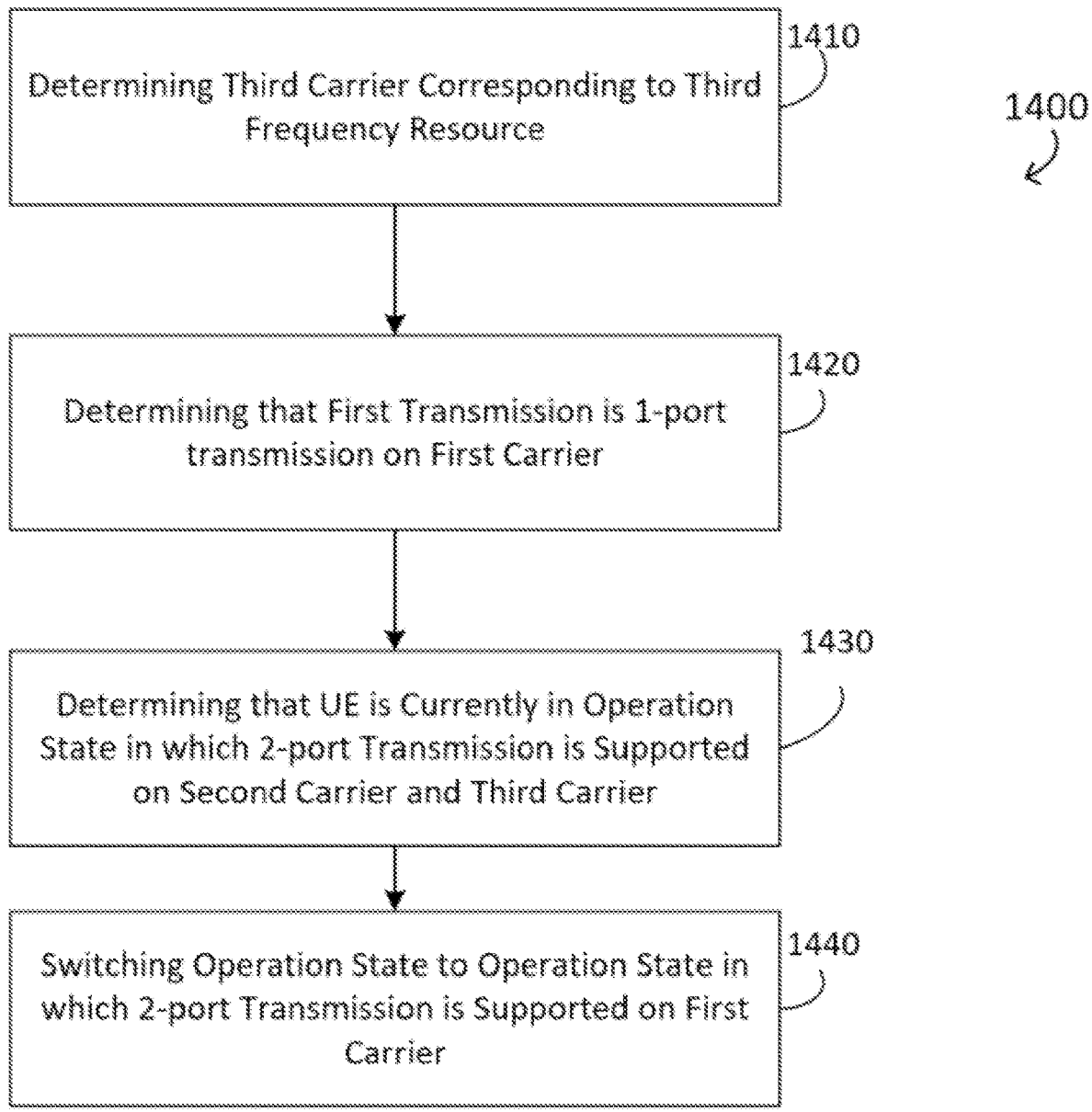
FIG. 14 is a flowchart diagram illustrating an example embodiment of the wireless communication method of FIG. 1A, according to various arrangements.

FIG. 14 is a flowchart illustrating a method 1400 for wireless communication, according to various arrangements. As shown in FIG. 14, the method 1400 is an embodiment of the method 100*a* and is performed by a UE. The method 1400 begins at block 1410, where the UE determines the third carrier corresponding to the third frequency resource. At block 1420, the UE determines that the first transmission is a 1-port transmission on the first carrier. At block 1430, the UE determines that the UE is currently in an operation state in which 2-port transmission is supported on the second carrier and the third carrier, and, at block 1440, switches the operation state to an operation state in which 2-port transmission is supported on the first carrier.

Figure 15:
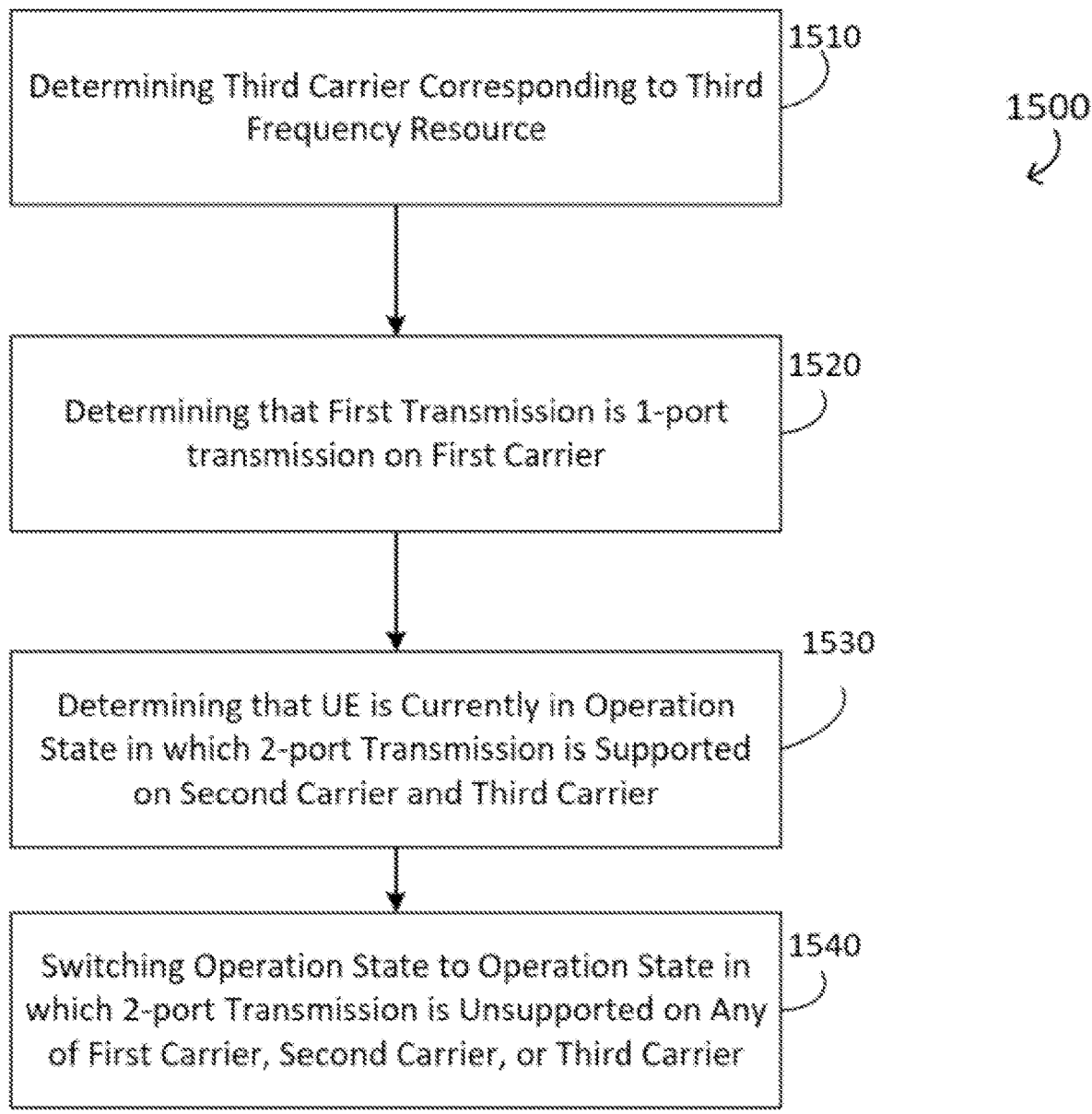
FIG. 15 is a flowchart diagram illustrating an example embodiment of the wireless communication method of FIG. 1A, according to various arrangements.

FIG. 15 is a flowchart illustrating a method 1500 for wireless communication, according to various arrangements. As shown in FIG. 15, the method 1500 is an embodiment of the method 100*a* and is performed by a UE. The method 1500 begins at block 1510, where the UE determines the third carrier corresponding to the third frequency resource. At block 1520, the UE determines that the first transmission is a 1-port transmission on the first carrier. At block 1530, the UE determines that the UE is currently in an operation state in which 2-port transmission is supported on the second carrier and third carrier, and, at block 1540, switches the operation state to an operation state in which 2-port transmission is unsupported on any of the first carrier, the second carrier, or the third carrier.

Figure 16:
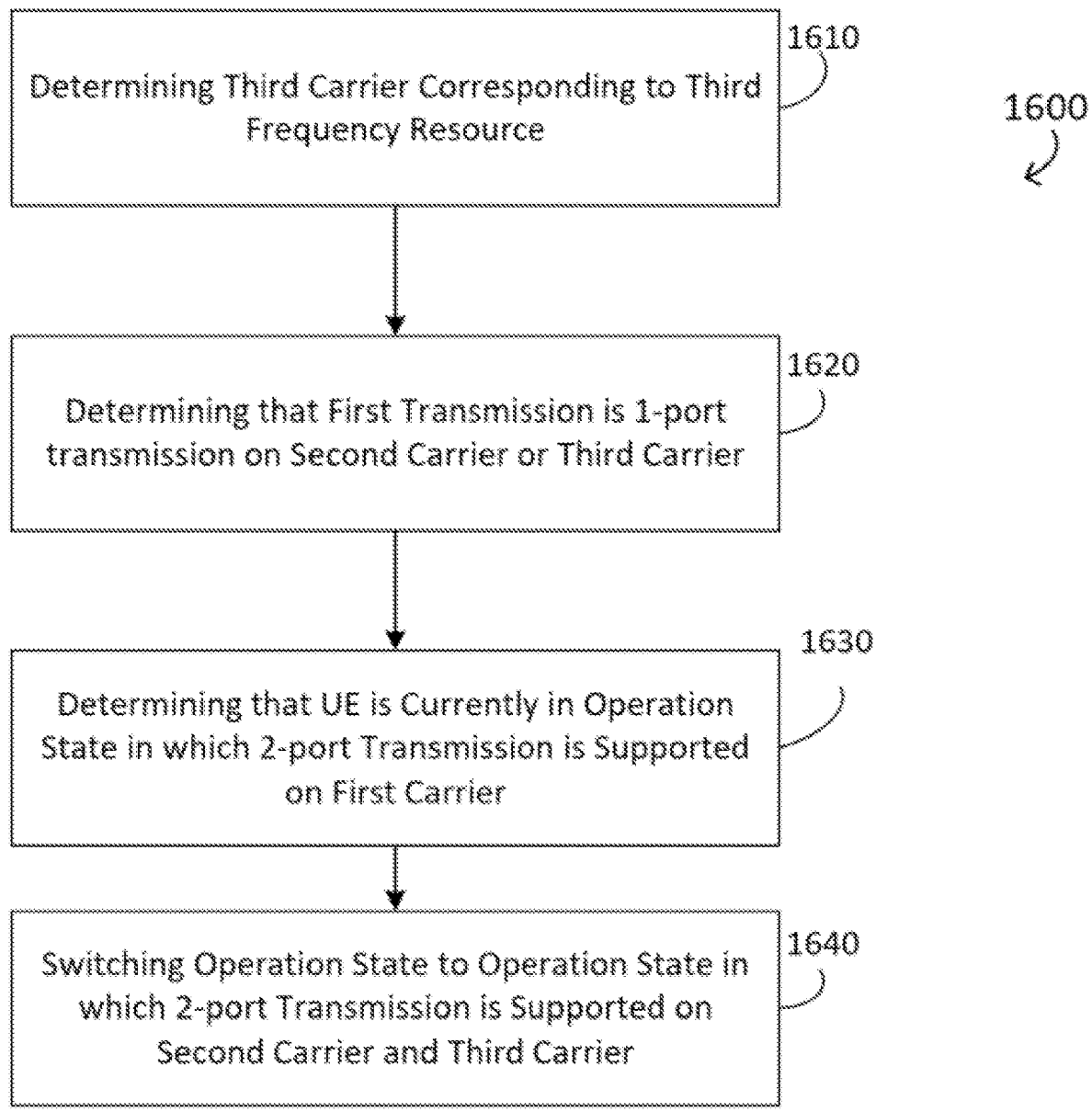
FIG. 16 is a flowchart diagram illustrating an example embodiment of the wireless communication method of FIG. 1A, according to various arrangements.

FIG. 16 is a flowchart illustrating a method 1600 for wireless communication, according to various arrangements. As shown in FIG. 16, the method 1600 is an embodiment of the method 100*a* and is performed by a UE. The method 1600 begins at block 1610, where the UE determines the third carrier corresponding to the third frequency resource. At block 1620, the UE determines that the first transmission is a 1-port transmission on the second carrier or third carrier. At block 1630, the UE determines that the UE is currently in an operation state in which 2-port transmission is supported on the first carrier, and, at block 1640, switches the operation state to an operation state in which 2-port transmission is supported on the second carrier and the third carrier.

Figure 17:
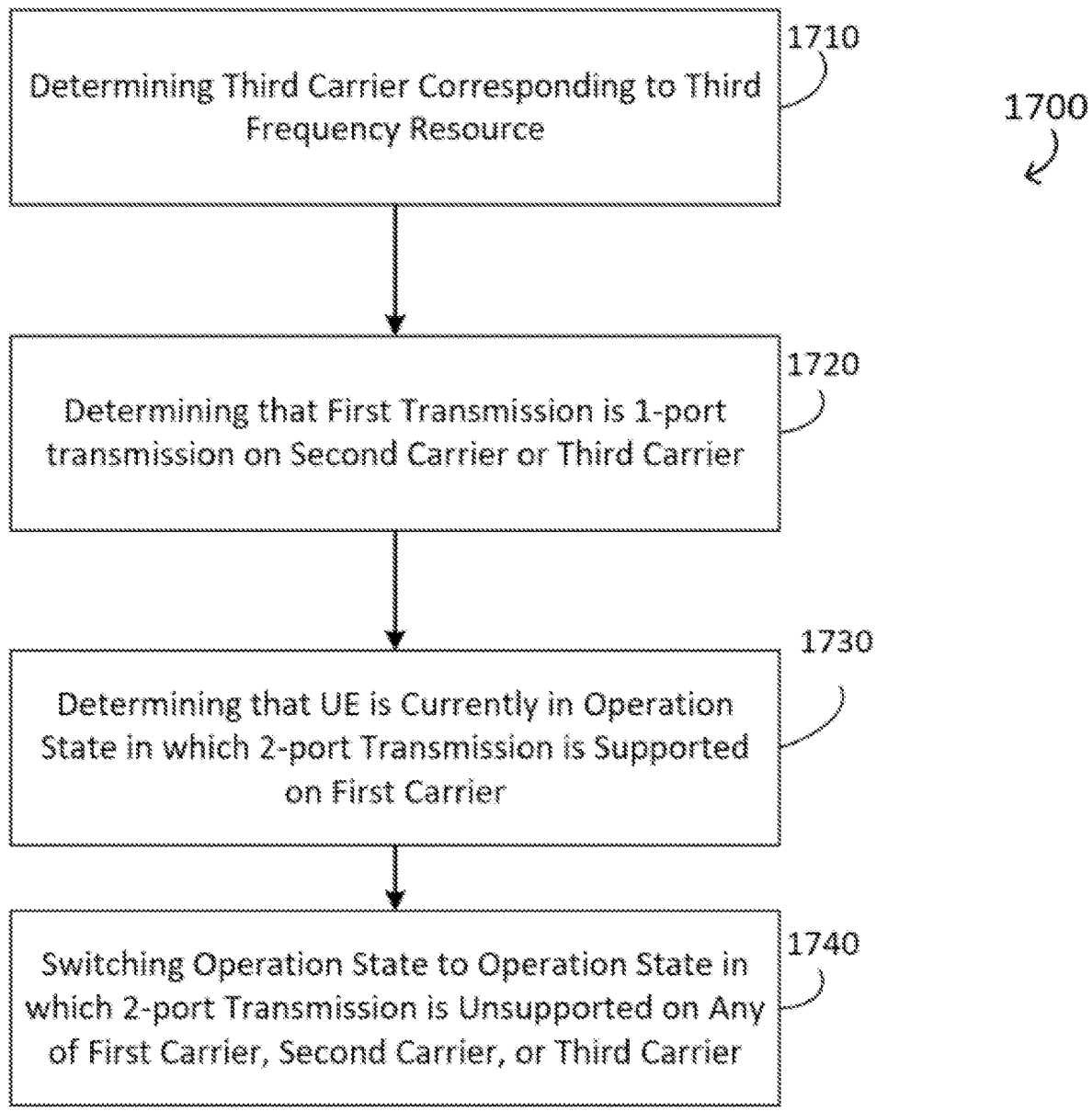
FIG. 17 is a flowchart diagram illustrating an example embodiment of the wireless communication method of FIG. 1A, according to various arrangements.

FIG. 17 is a flowchart illustrating a method 1700 for wireless communication, according to various arrangements. As shown in FIG. 17, the method 1700 is an embodiment of the method 100*a* and is performed by a UE. The method 1700 begins at block 1710, where the UE determines the third carrier corresponding to the third frequency resource. At block 1720, the UE determines that the first transmission is a 1-port transmission on the second carrier or third carrier. At block 1730, the UE determines that the UE is currently in an operation state in which 2-port transmission is supported on the first carrier, and, at block 1740, switches the operation state to an operation state in which 2-port transmission is unsupported on any of the first carrier, the second carrier, or the third carrier.

Figure 18:
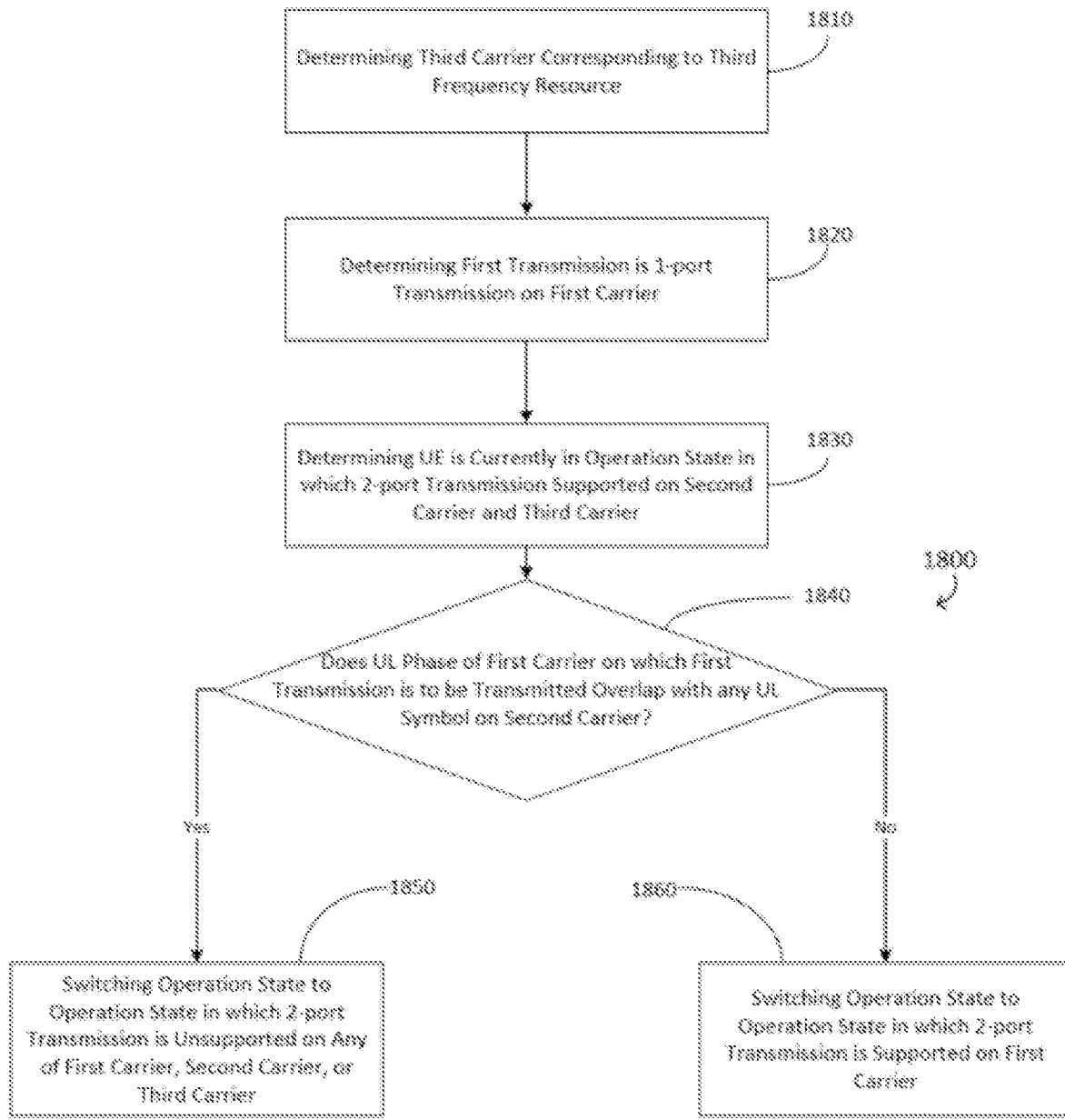
FIG. 18 is a flowchart diagram illustrating an example embodiment of the wireless communication method of FIG. 1A, according to various arrangements.

FIG. 18 is a flowchart illustrating a method 1800 for wireless communication, according to various arrangements. As shown in FIG. 18, the method 1800 is an embodiment of the method 100*a* and is performed by a UE. The method 1800 begins at block 1810, where the UE determines the third carrier corresponding to the third frequency resource. At block 1820, the UE determines that the first transmission is a 1-port transmission on the first carrier. At block 1830, the UE determines that the UE is currently in an operation state in which 2-port transmission is supported on the second carrier and third carrier. At block 1840, the UE determines whether a UL phase of the first carrier on which the first transmission is to be transmitted overlaps in time with a UL symbol on the second carrier or the third carrier. If there is overlap (1840: YES), the UE switches the operation state to an operation state in which 2-port transmission is unsupported on any of the first carrier, the second carrier, or the third carrier at block 1850. If there is no overlap (1840: NO), the UE switches the operation state to an operation state in which 2-port transmission is supported on the first carrier at block 1860.

Figure 19:
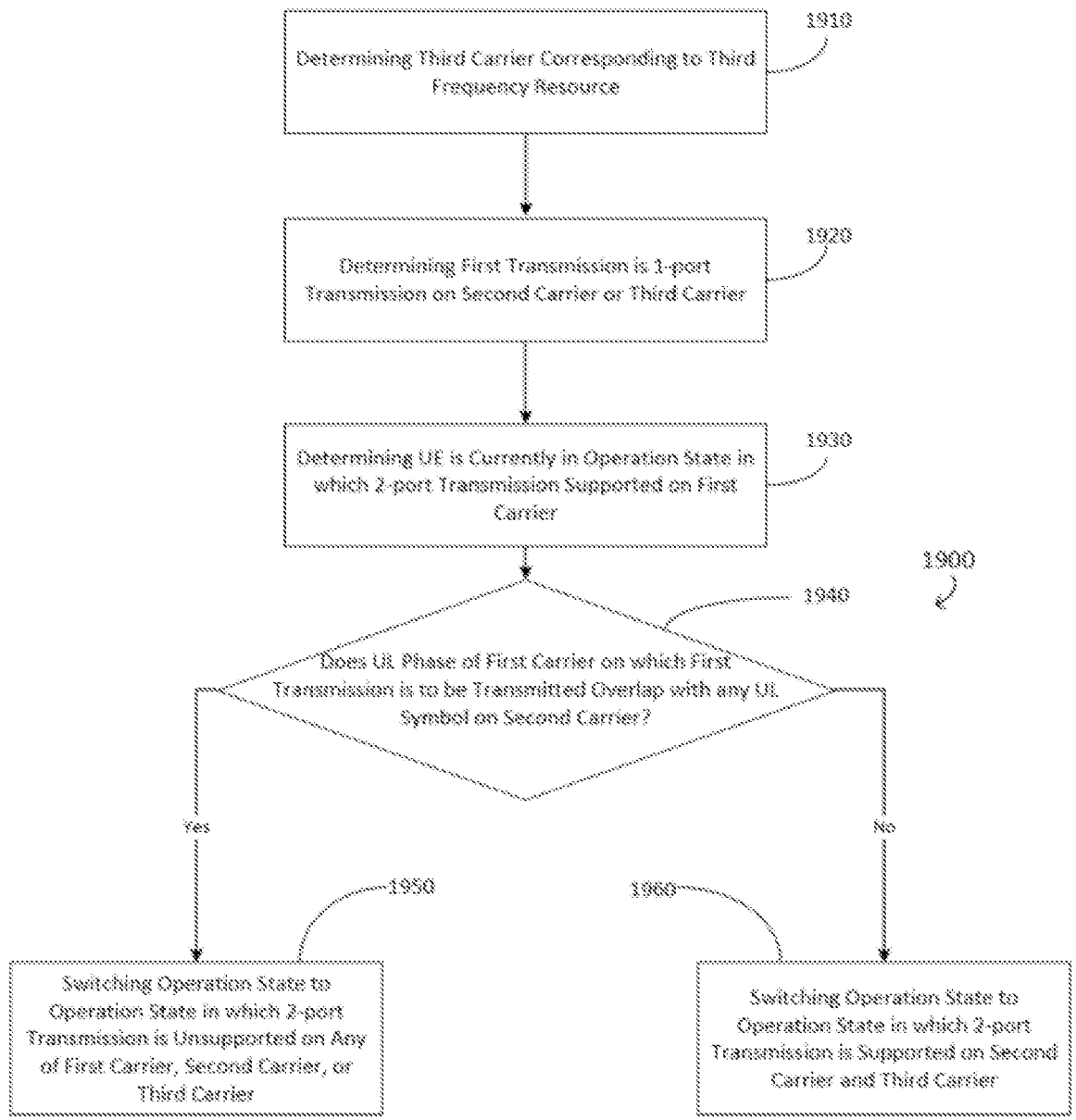
FIG. 19 is a flowchart diagram illustrating an example embodiment of the wireless communication method of FIG. 1A, according to various arrangements.
Figure 20A:
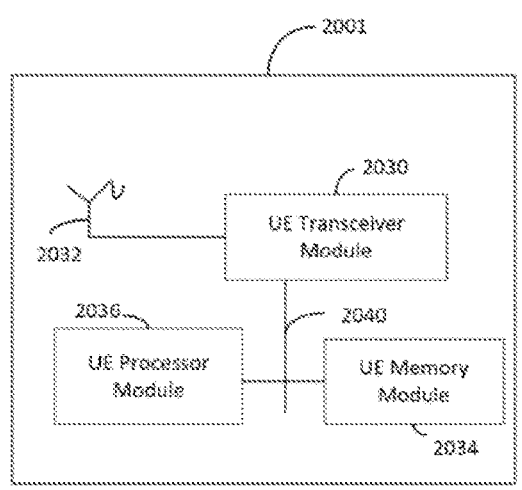
FIG. 20A illustrates a block diagram of an example user equipment, according to various arrangements.
Figure 20B:
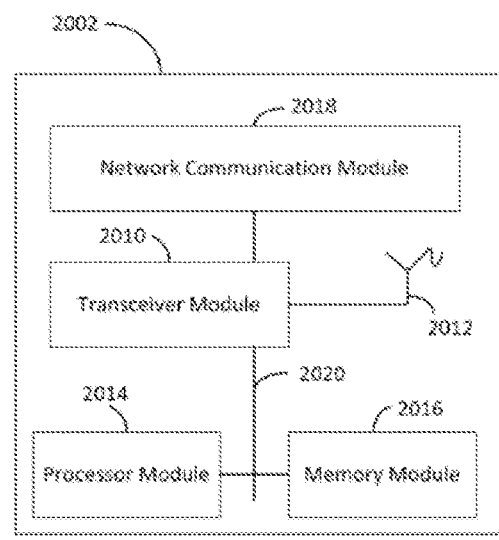
FIG. 20B illustrates a block diagram of an example base station, according to various arrangements.

FIG. 19 is a flowchart illustrating a method 1900 for wireless communication, according to various arrangements. As shown in FIG. 19, the method 1900 is an embodiment of the method 100*a* and is performed by a UE. The method 1900 begins at block 1910, where the UE determines the third carrier corresponding to the third frequency resource. At block 1920, the UE determines that the first transmission is a 1-port transmission on the second carrier or third carrier. At block 1930, the UE determines that the UE is currently in an operation state in which 2-port transmission is supported on the first carrier. At block 1940, the UE determines whether a UL phase of the second carrier or the third carrier on which the first transmission is to be transmitted overlaps in time with a UL symbol the first carrier. If there is overlap (1940: YES), the UE switches the operation state to an operation state in which 2-port transmission is unsupported on any of the first carrier, the second carrier, or the third carrier. If there is no overlap (1940: NO), the UE switches the operation state to an operation state in which 2-port transmission is supported on the second carrier and the third carrier at block 1960.

FIG. 1B is a flowchart diagram illustrating an example wireless communication method 100*b*, according to various arrangements. As shown in FIG. 1B, method 100*b* can be performed by a BS. The method 100*b* begins at block 130, where the BS configures, for a UE, a first carrier (i.e., carrier1) corresponding to a first frequency resource (i.e., Band X) and a second carrier (i.e., carrier2) corresponding to a second frequency resource (i.e., Band Y). At block 140, the BS communicates, with the UE, using one or more of the first carrier or the second carrier. Whether to receive a third transmission during a time interval (i.e., $N_{TX1-TX2}$) is determined based on a first transmission, a second transmission, and an operation state. The second transmission is received before the first transmission is to be received.

In some embodiments of method 100*b*, the method 100*b* further includes transmitting, to the UE, an indication that indicates a switching rule according to which the UE switches from a first operation state to a second operation state.

FIG. 2A illustrates a block diagram of an example UE 201, in accordance with some embodiments of the present disclosure. FIG. 2B illustrates a block diagram of an example BS 202, in accordance with some embodiments of the present disclosure. The UE 201 (e.g., a wireless communication device, a terminal, a mobile device, a mobile user, and so on) is an example implementation of the UEs described herein, and the BS 202 is an example implementation of the BS described herein.

The BS 202 and the UE 201 can include components and elements configured to support known or conventional operating features that need not be described in detail herein. In one illustrative embodiment, the BS 202 and the UE 201 can be used to communicate (e.g., transmit and receive) data symbols in a wireless communication environment, as described above. For instance, the BS 202 can be a BS (e.g., gNB, eNB, and so on), a server, a node, or any suitable computing device used to implement various network functions.

The BS 202 includes a transceiver module 210, an antenna 212, a processor module 214, a memory module 216, and a network communication module 218. The module 210, 212, 214, 216, and 218 are operatively coupled to and interconnected with one another via a data communication bus 220. The UE 201 includes a UE transceiver module 230, a UE antenna 232, a UE memory module 234, and a UE processor module 236. The modules 230, 232, 234, and 236 are operatively coupled to and interconnected with one another via a data communication bus 240. The BS 202 communicates with the UE 201 or another BS via a communication channel, which can be any wireless channel or other medium suitable for transmission of data as described herein.

As would be understood by persons of ordinary skill in the art, the BS 202 and the UE 201 can further include any number of modules other than the modules shown in FIGS.

2A and 2B. The various illustrative blocks, modules, circuits, and processing logic described in connection with the embodiments disclosed herein can be implemented in hardware, computer-readable software, firmware, or any practical combination thereof. To illustrate this interchangeability and compatibility of hardware, firmware, and software, various illustrative components, blocks, modules, circuits, and steps are described generally in terms of their functionality. Whether such functionality is implemented as hardware, firmware, or software can depend upon the particular application and design constraints imposed on the overall system. The embodiments described herein can be implemented in a suitable manner for each particular application, but any implementation decisions should not be interpreted as limiting the scope of the present disclosure.

In accordance with some embodiments, the UE transceiver 230 includes a radio frequency (RF) transmitter and a RF receiver each including circuitry that is coupled to the antenna 232. A duplex switch (not shown) may alternatively couple the RF transmitter or receiver to the antenna in time duplex fashion. Similarly, in accordance with some embodiments, the transceiver 210 includes an RF transmitter and a RF receiver each having circuitry that is coupled to the antenna 212 or the antenna of another BS. A duplex switch may alternatively couple the RF transmitter or receiver to the antenna 212 in time duplex fashion. The operations of the two-transceiver modules 210 and 230 can be coordinated in time such that the receiver circuitry is coupled to the antenna 232 for reception of transmissions over a wireless transmission link at the same time that the transmitter is coupled to the antenna 212. In some embodiments, there is close time synchronization with a minimal guard time between changes in duplex direction.

The UE transceiver 230 and the transceiver 210 are configured to communicate via the wireless data communication link, and cooperate with a suitably configured RF antenna arrangement 212/232 that can support a particular wireless communication protocol and modulation scheme. In some illustrative embodiments, the UE transceiver 230 and the transceiver 210 are configured to support industry standards such as the Long Term Evolution (LTE) and emerging 5G standards, and the like. It is understood, however, that the present disclosure is not necessarily limited in application to a particular standard and associated protocols. Rather, the UE transceiver 230 and the BS transceiver 210 may be configured to support alternate, or additional, wireless data communication protocols, including future standards or variations thereof.

The transceiver 210 and the transceiver of another BS (such as but not limited to, the transceiver 210) are configured to communicate via a wireless data communication link, and cooperate with a suitably configured RF antenna arrangement that can support a particular wireless communication protocol and modulation scheme. In some illustrative embodiments, the transceiver 210 and the transceiver of another BS are configured to support industry standards such as the LTE and emerging 5G standards, and the like. It is understood, however, that the present disclosure is not necessarily limited in application to a particular standard and associated protocols. Rather, the transceiver 210 and the transceiver of another BS may be configured to support alternate, or additional, wireless data communication protocols, including future standards or variations thereof.

In accordance with various embodiments, the BS 202 may be a BS such as but not limited to, an eNB, a serving eNB, a target eNB, a femto station, or a pico station, for example. The BS 202 can be an RN, a DeNB, or a gNB. In some embodiments, the UE 201 may be embodied in various types of user devices such as a mobile phone, a smart phone, a personal digital assistant (PDA), tablet, laptop computer, wearable computing device, etc. The processor modules 214 and 236 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

Furthermore, the method or algorithm disclosed herein can be embodied directly in hardware, in firmware, in a software module executed by processor modules 214 and 236, respectively, or in any practical combination thereof. The memory modules 216 and 234 may be realized as RAM memory, flash memory, ROM memory, EPROM memory, EEPROM memory, registers, a hard disk, a removable disk, a CD-ROM, or any other form of storage medium known in the art. In this regard, memory modules 216 and 234 may be coupled to the processor modules 214 and 236, respectively, such that the processors modules 214 and 236 can read information from, and write information to, memory modules 216 and 234, respectively. The memory modules 216 and 234 may also be integrated into their respective processor modules 214 and 236. In some embodiments, the memory modules 216 and 234 may each include a cache memory for storing temporary variables or other intermediate information during execution of instructions to be executed by processor modules 214 and 236, respectively. Memory modules 216 and 234 may also each include non-volatile memory for storing instructions to be executed by the processor modules 214 and 236, respectively.

The network communication module 218 generally represents the hardware, software, firmware, processing logic, and/or other components of the BS 202 that enable bi-directional communication between the transceiver 210 and other network components and communication nodes in communication with the BS 202. For example, the network communication module 218 may be configured to support internet or WiMAX traffic. In a deployment, without limitation, the network communication module 218 provides an 802.3 Ethernet interface such that the transceiver 210 can communicate with a conventional Ethernet based computer network. In this manner, the network communication module 218 may include a physical interface for connection to the computer network (e.g., Mobile Switching Center (MSC)). In some embodiments, the network communication module 218 includes a fiber transport connection configured to connect the BS 202 to a core network. The terms "configured for," "configured to" and conjugations thereof, as used herein with respect to a specified operation or function, refer to a device, component, circuit, structure, machine, signal, etc., that is physically constructed, programmed, formatted and/or arranged to perform the specified operation or function.

While various embodiments of the present solution have been described above, it should be understood that they have been presented by way of example only, and not by way of limitation. Likewise, the various diagrams may depict an example architectural or configuration, which are provided to enable persons of ordinary skill in the art to understand example features and functions of the present solution. Such persons would understand, however, that the solution is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described illustrative embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software module), or any combination of these techniques. To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the present solution.

Additionally, memory or other storage, as well as communication components, may be employed in embodiments of the present solution. It will be appreciated that, for clarity purposes, the above description has described embodiments of the present solution with reference to different functional units and processors. However, it will be apparent that any suitable distribution of functionality between different functional units, processing logic elements or domains may be used without detracting from the present solution. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein, but is to be accorded the widest scope consistent with the novel features and principles disclosed herein, as recited in the claims below.

What is claimed:
1. A wireless communication method, comprising:
 determining, by a wireless communication device, a first carrier corresponding to a first frequency resource, a second carrier corresponding to a second frequency resource, and a third carrier corresponding to a third frequency resource; and
 determining, by the wireless communication device, whether to omit from transmitting an uplink transmission using any of the first carrier, the second carrier, and the third carrier during a time interval based at least in part on:

a first transmission on at least one carrier of the first carrier, the second carrier, or the third carrier;
a second transmission on the at least one carrier of the first carrier, the second carrier, or the third carrier; and
an operation state of the wireless communication device,
wherein the second transmission being transmitted before the first transmission is to be transmitted, wherein the operation state comprises at least one of a plurality of operations states specifying whether one or more of 1-port transmission or 2-port transmission is supported by the wireless communication device on each of the first carrier, the second carrier, or the third carrier.

2. The method of claim 1, wherein
the wireless communication device is to transmit a 1-port or 2-port transmission on the third carrier;
preceding uplink transmissions are a 1-port transmission on the first carrier and a 1-port transmission on the second carrier;
the wireless communication device omits transmitting the uplink transmission for any of the first carrier, the second carrier, or the third carrier during the time interval.

3. The method of claim 1, wherein
the wireless communication device is to transmit a 1-port transmission on the second carrier or the third carrier;
the preceding uplink transmission is a 1-port or 2-port transmission on the first carrier; and
the operation state of the wireless communication device comprises supporting 2-port transmissions in the first carrier; and
the wireless communication device omits transmitting the uplink transmission for any of the first carrier, the second carrier, or the third carrier during the time interval.

4. The method of claim 1, wherein
the wireless communication device is to transmit a 1-port transmission on the first carrier and a 1-port transmission on the third carrier;
the preceding uplink transmission is a 1-port transmission on the second carrier or the third carrier;
the wireless communication device omits transmitting the uplink transmission for any of the first carrier, the second carrier, or the third carrier during the time interval.

5. A wireless communication method, comprising:
configuring, by a network for a wireless communication device, a first carrier corresponding to a first frequency resource, a second carrier corresponding to a second frequency resource, and a third carrier corresponding to a third frequency resource; and
communicating, by the network with the wireless communication device, using one or more of the first carrier, the second carrier, and the third carrier,
wherein whether to omit from receiving an uplink transmission using any of the first carrier, the second carrier, or the third carrier during a time interval is determined based at least in part on:
a first transmission on at least one carrier of the first carrier, the second carrier, or the third carrier;
a second transmission on the at least one carrier of the first carrier, the second carrier, or the third carrier; and
an operation state of the wireless communication device,
wherein the second transmission being received before the first transmission is to be received, wherein the operation state comprises at least one of a plurality of operations states specifying whether one or more of 1-port transmission or 2-port transmission is supported by the wireless communication device on each of the first carrier, the second carrier, or the third carrier.

6. The method of claim 5, wherein
the wireless communication device is to transmit a 1-port or 2-port transmission on the third carrier;
preceding uplink transmissions are a 1-port transmission on the first carrier and a 1-port transmission on the second carrier;
the wireless communication device omits transmitting the uplink transmission for any of the first carrier, the second carrier, or the third carrier during the time interval.

7. The method of claim 5, wherein
the wireless communication device is to transmit a 1-port transmission on the second carrier or the third carrier;
the preceding uplink transmission is a 1-port or 2-port transmission on the first carrier; and
the operation state of the wireless communication device comprises supporting 2-port transmissions in the first carrier; and
the wireless communication device omits transmitting the uplink transmission for any of the first carrier, the second carrier, or the third carrier during the time interval.

8. The method of claim 5, wherein
the wireless communication device is to transmit a 1-port transmission on the first carrier and a 1-port transmission on the third carrier;
the preceding uplink transmission is a 1-port transmission on the second carrier or the third carrier;
the wireless communication device omits transmitting the uplink transmission for any of the first carrier, the second carrier, or the third carrier during the time interval.

9. A wireless communication device, comprising:
at least one processor configured to:
determine a first carrier corresponding to a first frequency resource, a second carrier corresponding to a second frequency resource, and a third carrier corresponding to a third frequency resource; and
determine whether to omit from transmitting an uplink transmission using any of the first carrier, the second carrier, and the third carrier during a time interval based at least in part on:
a first transmission on at least one carrier of the first carrier, the second carrier, or the third carrier;
a second transmission on the at least one carrier of the first carrier, the second carrier, or the third carrier; and
an operation state of the wireless communication device,
wherein the second transmission being transmitted before the first transmission is to be transmitted, wherein the operation state comprises at least one of a plurality of operations states specifying whether one or more of 1-port transmission or 2-port transmission is supported by the wireless communication device on each of the first carrier, the second carrier, or third carrier.

10. The wireless communication device of claim 9, wherein the at least one processor configured to transmit a 1-port or 2-port transmission on the third carrier;

preceding uplink transmissions are a 1-port transmission on the first carrier and a 1-port transmission on the second carrier;

the at least one processor configured to omit transmitting the uplink transmission for any of the first carrier, the second carrier, or the third carrier during the time interval.

11. The wireless communication device of claim 9, wherein the at least one processor configured to transmit a 1-port transmission on the second carrier or the third carrier;

the preceding uplink transmission is a 1-port or 2-port transmission on the first carrier; and the operation state of the wireless communication device comprises supporting 2-port transmissions in the first carrier; and the at least one processor configured to omit transmitting the uplink transmission for any of the first carrier, the second carrier, or the third carrier during the time interval.

12. The wireless communication device of claim 9, wherein the at least one processor configured to transmit a 1-port transmission on the first carrier and a 1-port transmission on the third carrier;

the preceding uplink transmission is a 1-port transmission on the second carrier or the third carrier;

the at least one processor configured to omit transmitting the uplink transmission for any of the first carrier, the second carrier, or the third carrier during the time interval.

13. A network, comprising:

at least one processor configured to:

configure, for a wireless communication device, a first carrier corresponding to a first frequency resource, a second carrier corresponding to a second frequency resource, and a third carrier corresponding to a third frequency resource; and communicate, with the wireless communication device, using one or more of the first carrier, the second carrier, and the third carrier, wherein whether to omit from receiving an uplink transmission using any of the first carrier, the second carrier, or the third carrier during a time interval is determined based at least in part on:

a first transmission on at least one carrier of the first carrier, the second carrier, or the third carrier;

a second transmission on the at least one carrier of the first carrier, the second carrier, or the third carrier; and an operation state of the wireless communication device, wherein the second transmission being received before the first transmission is to be received, wherein the operation state comprises at least one of a plurality of operations states specifying whether one or more of 1-port transmission or 2-port transmission is supported by the wireless communication device on each of the first carrier, the second carrier, or third carrier.

14. The network of claim 13, wherein the wireless communication device is to transmit a 1-port or 2-port transmission on the third carrier;

preceding uplink transmissions are a 1-port transmission on the first carrier and a 1-port transmission on the second carrier;

the wireless communication device omits transmitting the uplink transmission for any of the first carrier, the second carrier, or the third carrier during the time interval.

15. The network of claim 13, wherein the wireless communication device is to transmit a 1-port transmission on the second carrier or the third carrier;

the preceding uplink transmission is a 1-port or 2-port transmission on the first carrier; and the operation state of the wireless communication device comprises supporting 2-port transmissions in the first carrier; and the wireless communication device omits transmitting the uplink transmission for any of the first carrier, the second carrier, or the third carrier during the time interval.

16. The network of claim 13, wherein the wireless communication device is to transmit a 1-port transmission on the first carrier and a 1-port transmission on the third carrier;

the preceding uplink transmission is a 1-port transmission on the second carrier or the third carrier;

the wireless communication device omits transmitting the uplink transmission for any of the first carrier, the second carrier, or the third carrier during the time interval.

\* \* \* \* \*